US008482672B2

(12) United States Patent
Yuki

(10) Patent No.: US 8,482,672 B2
(45) Date of Patent: Jul. 9, 2013

(54) VIDEO OUTPUT DEVICE AND VIDEO OUTPUT METHOD

(75) Inventor: Yasuhiro Yuki, Osaka (JP)

(73) Assignee: Panasonic Corporation, Osaka (JP)

( * ) Notice: Subject to any disclaimer, the term of this patent is extended or adjusted under 35 U.S.C. 154(b) by 417 days.

(21) Appl. No.: 12/747,019

(22) PCT Filed: Oct. 8, 2009

(86) PCT No.: PCT/JP2009/005255
§ 371 (c)(1),
(2), (4) Date: Jun. 9, 2010

(87) PCT Pub. No.: WO2010/041457
PCT Pub. Date: Apr. 15, 2010

(65) Prior Publication Data
US 2010/0265401 A1    Oct. 21, 2010

(30) Foreign Application Priority Data

Oct. 10, 2008  (JP) ................................. 2008-264004

(51) Int. Cl.
*H04N 5/45*           (2011.01)
(52) U.S. Cl.
USPC ............................ 348/565; 348/564; 348/468
(58) Field of Classification Search
USPC ................. 348/563–569, 725, 552–554, 460, 348/468, 473, 584, 465, 600; 725/38–40; 345/327, 629; 455/5.1, 4.2
IPC ........................................................ H04N 5/45
See application file for complete search history.

(56) References Cited

U.S. PATENT DOCUMENTS 5,990,972 A * 11/1999 Bond-Harris et al. ........ 348/563
6,230,321 B1 * 5/2001 Kim .................................. 725/37
(Continued)

FOREIGN PATENT DOCUMENTS

| JP | 7-222072 A | 8/1995 |
| JP | 7-236100 A | 9/1995 |
| JP | 08-317301 A | 11/1996 |
| JP | 10-234016 A | 9/1998 |

(Continued)

OTHER PUBLICATIONS

International Search Report for PCT/JP2009/005255; Dec. 22, 2009.

*Primary Examiner* — Trang U Tran
(74) *Attorney, Agent, or Firm* — Pearne & Gordon LLP

(57) ABSTRACT

A video output device includes a screen configuration management section for managing a placement or a scaling of a screen for displaying at least one video, an area determination section for determining a character area in an input video, a supplemental information storing section for cutting out a video on a supplemental information area including the at least one character area determined by the area determination section and storing it as supplemental information, a supplemental information display determination section for determining whether or not the supplemental information stored by the supplemental information storing section is displayed in addition to an input video based on the screen configuration managed by the screen configuration management section, and an output section for outputting the input video and the supplemental information in accordance with commands from the screen configuration management section and the supplemental information display determination section. The supplemental information display determination section determines that the supplemental information is displayed based on a size of a character included in the character area in the input video changing in response to a scaling managed by the screen configuration management section. Therefore, the display form of the supplemental information can be changed in response to a scaling factor of the display size of the input video.

7 Claims, 31 Drawing Sheets

U.S. PATENT DOCUMENTS

| | | | |
|---|---|---|---|
| 6,285,407 B1 * | 9/2001 | Yasuki et al. | 348/554 |
| 6,885,406 B2 * | 4/2005 | Yui et al. | 348/564 |
| 7,659,942 B2 * | 2/2010 | Nakayama | 348/564 |
| 2002/0067433 A1 | 6/2002 | Yui et al. | |
| 2009/0109337 A1 * | 4/2009 | Imai et al. | 348/564 |

FOREIGN PATENT DOCUMENTS

| | | |
|---|---|---|
| JP | 2001169199 A | 6/2001 |
| JP | 2002-171457 A | 6/2002 |
| JP | 2006-014004 A | 1/2006 |

* cited by examiner

FIG. 7 (a)
FIG. 7 (b)
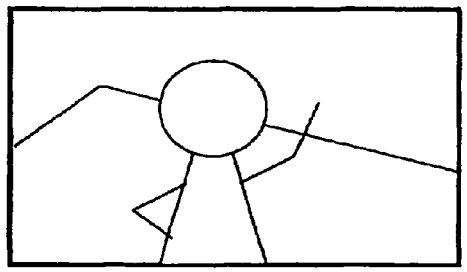
FIG. 7 (c)
TWO-SCREEN DISPLAY STATE A
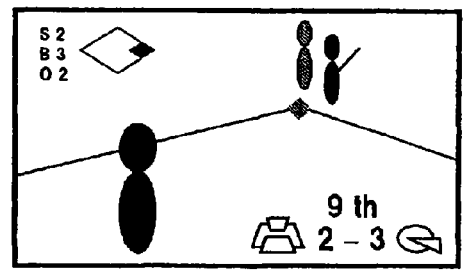
FIG. 7 (d)
TWO-SCREEN DISPLAY STATE B
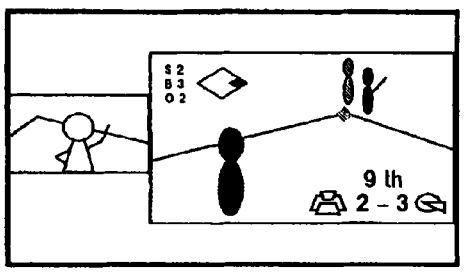
FIG. 7 (e)
TWO-SCREEN DISPLAY STATE C
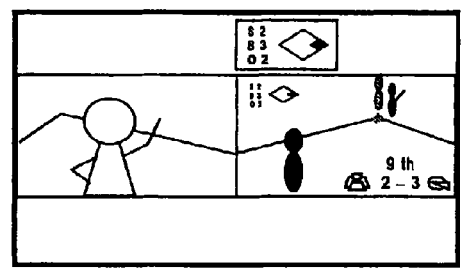
FIG. 7 (f)
TWO-SCREEN DISPLAY STATE D
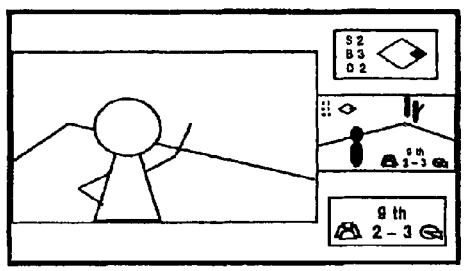
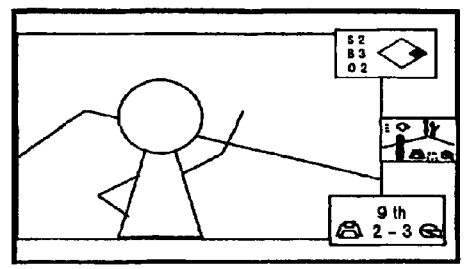

FIG. 8

| | INPUT SOURCE | OUTPUT FLAG | WIDTH (W) | HEIGHT (H) | HORIZONTAL AXIS (X) | VERTICAL AXIS (Y) | DEPTH (Z) | TRANS-PARENCY ($\alpha$) | SCALING (R)% |
|---|---|---|---|---|---|---|---|---|---|
| INPUT VIDEO 1 | FIRST TUNER | true | 1920 | 1080 | 0 | 0 | 0 | 255 | 100 |
| INPUT VIDEO 2 | SECOND TUNER | false | — | — | — | — | — | — | — |
| INPUT VIDEO 3 | EXTERNAL INPUT | false | — | — | — | — | — | — | — |
| INPUT VIDEO 4 | COMMUNICATION SECTION (STREAMING) | false | — | — | — | — | — | — | — |
| ... | ... | ... | ... | ... | ... | ... | ... | ... | ... |
| INPUT VIDEO n | INPUT SOURCE X | true/false | w | h | x | y | z | $\alpha$ | r |

FIG. 9 (a)

| | INPUT SOURCE | OUTPUT FLAG | WIDTH (W) | HEIGHT (H) | HORIZONTAL AXIS (X) | VERTICAL AXIS (Y) | DEPTH (Z) | TRANS-PARENCY (α) | SCALING (R)% |
|---|---|---|---|---|---|---|---|---|---|
| INPUT VIDEO 1 | FIRST TUNER | true | 1920 | 1080 | 0 | 0 | 0 | 255 | 1.0 |
| INPUT VIDEO 2 | SECOND TUNER | false | - | - | - | - | - | - | - |

FIG. 9 (b)

| | INPUT SOURCE | OUTPUT FLAG | WIDTH (W) | HEIGHT (H) | HORIZONTAL AXIS (X) | VERTICAL AXIS (Y) | DEPTH (Z) | TRANS-PARENCY (α) | SCALING (R)% |
|---|---|---|---|---|---|---|---|---|---|
| INPUT VIDEO 1 | FIRST TUNER | true | 1920 | 1080 | 0 | 0 | 0 | 255 | 1.0 |
| INPUT VIDEO 2 | SECOND TUNER | false | - | - | - | - | - | - | - |

FIG. 9 (c)
TWO-SCREEN DISPLAY STATE A

| | INPUT SOURCE | OUTPUT FLAG | WIDTH (W) | HEIGHT (H) | HORIZONTAL AXIS (X) | VERTICAL AXIS (Y) | DEPTH (Z) | TRANS-PARENCY ($\alpha$) | SCALING (R)% |
|---|---|---|---|---|---|---|---|---|---|
| INPUT VIDEO 1 | FIRST TUNER | true | 480 | 270 | 0 | 405 | 0 | 255 | 0.25 |
| INPUT VIDEO 2 | SECOND TUNER | true | 1440 | 810 | 480 | 135 | 0 | 255 | 0.75 |

FIG. 9 (d)
TWO-SCREEN DISPLAY STATE B

| | INPUT SOURCE | OUTPUT FLAG | WIDTH (W) | HEIGHT (H) | HORIZONTAL AXIS (X) | VERTICAL AXIS (Y) | DEPTH (Z) | TRANS-PARENCY ($\alpha$) | SCALING (R)% |
|---|---|---|---|---|---|---|---|---|---|
| INPUT VIDEO 1 | FIRST TUNER | true | 960 | 540 | 0 | 270 | 0 | 255 | 0.5 |
| INPUT VIDEO 2 | SECOND TUNER | true | 960 | 540 | 960 | 270 | 0 | 255 | 0.5 |

FIG. 9(e)
TWO-SCREEN DISPLAY STATE C

| | INPUT SOURCE | OUTPUT FLAG | WIDTH (W) | HEIGHT (H) | HORIZONTAL AXIS (X) | VERTICAL AXIS (Y) | DEPTH (Z) | TRANS-PARENCY (α) | SCALING (R)% |
|---|---|---|---|---|---|---|---|---|---|
| INPUT VIDEO 1 | FIRST TUNER | true | 1440 | 810 | 0 | 135 | 0 | 255 | 0.75 |
| INPUT VIDEO 2 | SECOND TUNER | true | 480 | 270 | 1440 | 405 | 0 | 255 | 0.25 |

FIG. 9(f)
TWO-SCREEN DISPLAY STATE D

| | INPUT SOURCE | OUTPUT FLAG | WIDTH (W) | HEIGHT (H) | HORIZONTAL AXIS (X) | VERTICAL AXIS (Y) | DEPTH (Z) | TRANS-PARENCY (α) | SCALING (R)% |
|---|---|---|---|---|---|---|---|---|---|
| INPUT VIDEO 1 | FIRST TUNER | true | 1728 | 972 | 0 | 54 | 0 | 255 | 0.9 |
| INPUT VIDEO 2 | SECOND TUNER | true | 192 | 108 | 1728 | 486 | 0 | 255 | 0.1 |

FIG. 15

| ID | EXTRACTED CHARACTER STRING | PREVIOUS CHARACTER STRING | CHARACTER SIZE | WIDTH (W) | HEIGHT (H) | HORIZONTAL AXIS (X) | VERTICAL AXIS (Y) | CHANGE FLAG |
|---|---|---|---|---|---|---|---|---|
| T.1 | S 2 | S 2 | 18 | 30 | 15 | 20 | 10 | false |
| T.2 | B 3 | B 3 | 18 | 30 | 15 | 20 | 25 | false |
| T.3 | O 2 | O 2 | 18 | 30 | 15 | 20 | 40 | false |
| T.4 | 9 th | 9 th | 26 | 60 | 30 | 1720 | 830 | false |
| T.5 | 2 - 3 | 2 - 1 | 28 | 80 | 40 | 1700 | 860 | true |
| T.6 | 142 Km/h | 139 Km/h | 18 | 100 | 20 | 1780 | 10 | true |
| ... | ... | ... | ... | ... | ... | ... | ... | false |

FIG. 16

| ID | WIDTH (W) | HEIGHT (H) | HORIZONTAL AXIS (X) | VERTICAL AXIS (Y) |
|---|---|---|---|---|
| OJ.1 | 100 | 45 | 60 | 10 |
| OJ.2 | 70 | 600 | 80 | 480 |
| OJ.3 | 40 | 90 | 1660 | 5 |
| OJ.4 | 40 | 100 | 1720 | 10 |
| OJ.5 | 80 | 50 | 1610 | 850 |
| OJ.6 | 80 | 50 | 1800 | 850 |
| ... | ... | ... | ... | ... |

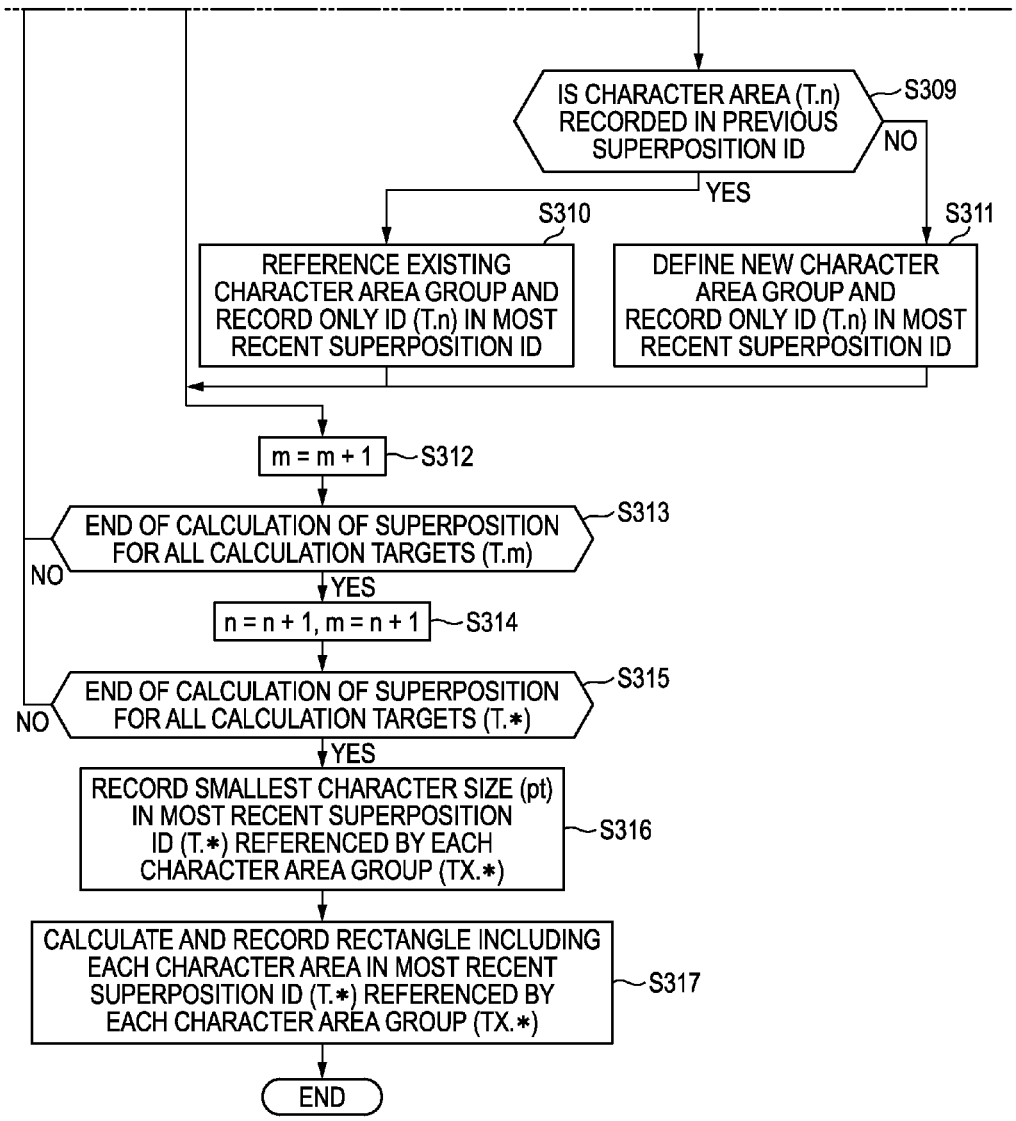

FIG. 19

| ID | MOST RECENT SUPERPOSITION ID (T.*) | PREVIOUS SUPERPOSITION ID (T.*) | CHARACTER SIZE | WIDTH (W) | HEIGHT (H) | HORIZONTAL AXIS (X) | VERTICAL AXIS (Y) |
|---|---|---|---|---|---|---|---|
| Tx.1 | T.1, T.2, T.3 | T.1, T.2, T.3 | 18 | 50 | 65 | 10 | 0 |
| Tx.2 | T.4, T.5 | T.4, T.5 | 26 | 100 | 90 | 1690 | 820 |
| Tx.3 | T.6 | — | 18 | 120 | 40 | 1770 | 0 |
| ... | ... | ... | ... | ... | ... | ... | ... |

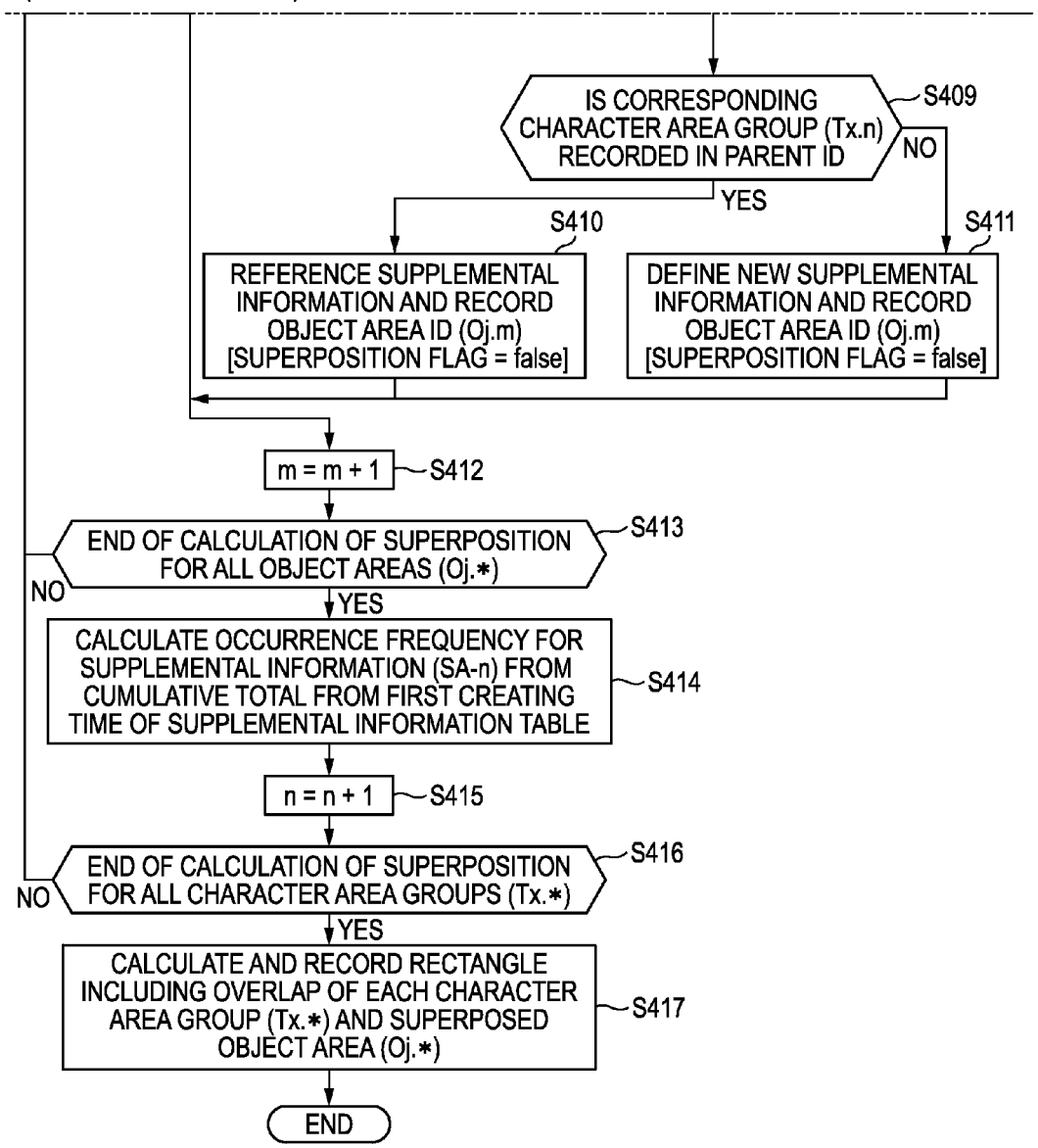

FIG. 24

| ID | PARENT ID | SUPER-POSITION | SUPERPOSITION ID (Oj.*) | WIDTH (W) | HEIGHT (H) | HORIZONTAL AXIS (X) | VERTICAL AXIS (Y) | OCCURRENCE CUMULATIVE TOTAL | OCCURRENCE FREQUENCY |
|---|---|---|---|---|---|---|---|---|---|
| SA-1 | Tx.1 | true | Oj.1 | 160 | 65 | 10 | 5 | 20 | 60 % |
| SA-2 | Tx.2 | true | Oj.5, Oj.6 | 250 | 90 | 1600 | 820 | 20 | 60 % |
| SA-3 | Tx.3 | false | | 120 | 40 | 1770 | 0 | 4 | 12 % |
| ... | ... | ... | ... | ... | ... | ... | ... | ... | ... |

FIG. 29

| ID | OUTLINE | WIDTH (W) | HEIGHT (H) | HORIZONTAL AXIS (X) | VERTICAL AXIS (Y) | SUPPLEMENTAL INFORMATION URL (JAPANESE VERSION) | SUPPLEMENTAL INFORMATION URL (ENGHLISH VERSION) |
|---|---|---|---|---|---|---|---|
| RP-1 | BATTER SCORE | 160 | 65 | 10 | 5 | http://support.com/␣/report-1.jpg | http://support.com/e/report-1.jpg |
| RP-2 | PROGRESS INFORMATION | 250 | 90 | 1600 | 820 | http://support.com/␣/report-2.jpg | http://support.com/e/report-2.jpg |
| RP-3 | SPEED OF PITCHED BALL | 120 | 40 | 1770 | 0 | http://support.com/␣/report-3.jpg | http://support.com/e/report-3.jpg |
| ... | ... | ... | ... | ... | ... | ... | ... |

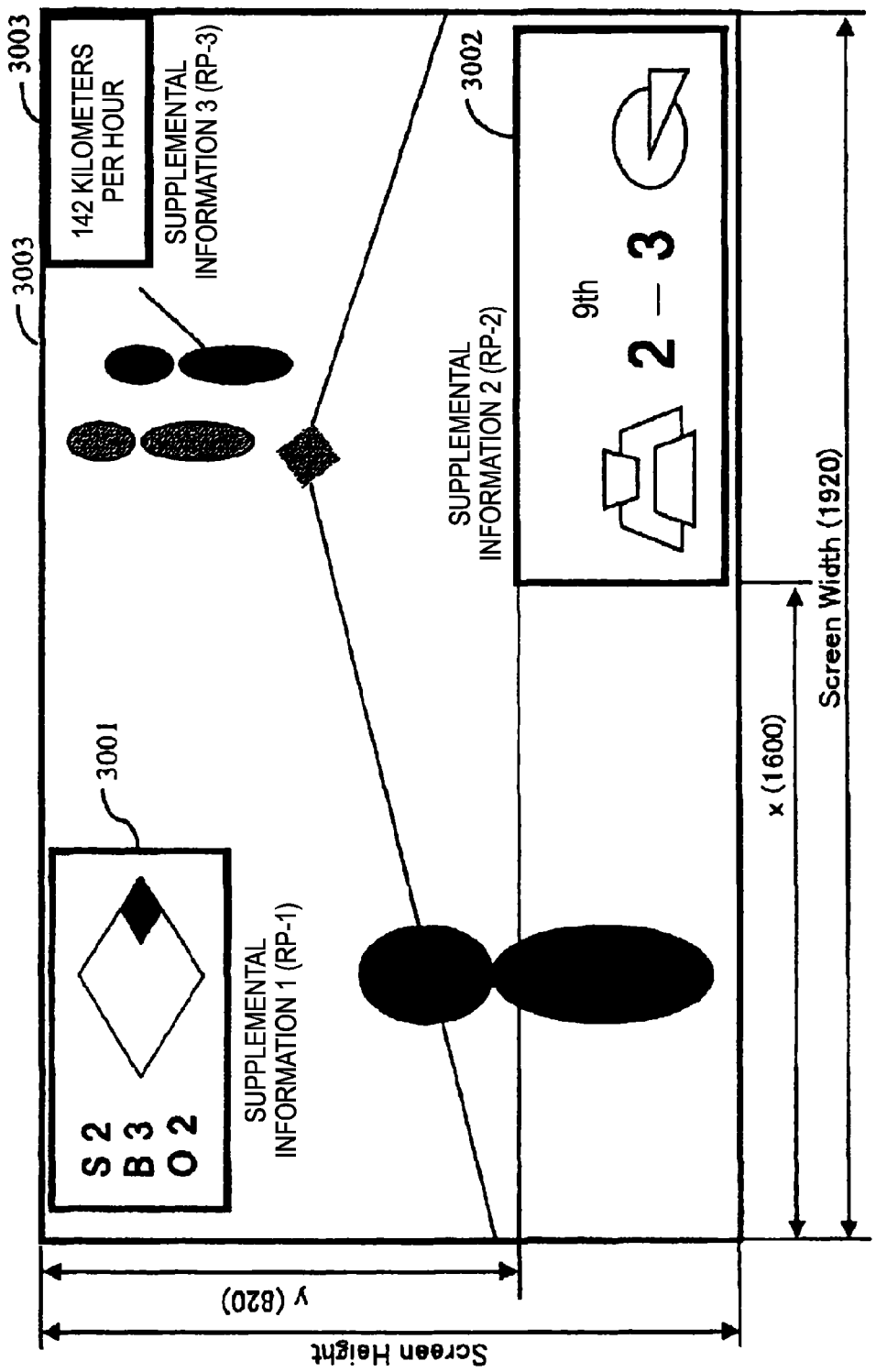

VIDEO OUTPUT DEVICE AND VIDEO OUTPUT METHOD

TECHNICAL FIELD

This invention relates to a video output device and a video output method for changing the display form of supplemental information in response to the scaling factor of the display size of input video.

BACKGROUND ART

Generally, a device for receiving a broadcast program provided by a TV broadcast station, a cable TV station, etc., processes a reception signal and outputs video. Hereinafter, the device will be called "video output device." The video output destination is a display installed in the video output device or an external display connected to the video output device through a communication member of a cable, etc. At this time, to meet the demand of the user who wants to view more than one program at the same time, for example, "two-screen mode" of displaying two input video images on two divided screens is widely known.

FIGS. 1(a) to (c) are drawings to show display patterns of general two-screen mode. FIG. 1(a) shows an example of displaying input video A and input video B in parallel in the same ratio. FIG. 1(b) shows an example of displaying input video A and input video B in different sizes. FIG. 1(c) shows an example of superposing input video B of a small screen on input video A displayed on the full screen. FIGS. 2(a) to (c) show display examples of assigning video to each display pattern of the two-screen mode shown in FIGS. 1(a) to (c).

When video is displayed on a display in the two-screen mode, generally the user performs predetermined operation, thereby switching the screen division pattern at a fixed ratio. However, recently, a video output device for dividing a screen at any desired ratio specified by the user has also appeared.

On the other hand, in a recent video output device, the screen becomes larger and higher functions are provided. For example, a model installing a plurality of tuners, a model installing a plurality of external input terminals that can be connected to a gaming machine, etc., a model of playing back a moving image received through the Internet, a model of recording a received program on a record medium for storage, and the like are available. Consequently, one large screen in a living room may be divided into three parts and the family may view three video images. For example, the following use is assumed: A mother and a daughter enjoy a recorded drama on a first division screen, a father enjoys a baseball relay on a second division screen, and a son enjoys a game on a third screen.

If a plurality of video images are scaled down and displayed at a fixed ratio or any desired ratio on the display of the video output device having the screen dividing function described above, a character string or a symbol in the scaled-down video may be crushed as shown in FIG. 2(a) to (c). At this time, the displayed information is hard to read by the user and cannot be recognized by the user; this is a problem.

One method of solving this problem is disclosed in Patent Document 1. According to the method in the document, when a program involving data broadcast is scaled down for display by screen division, the user superposes a menu screen of data broadcast specified by the program sending party outside the scaled-down screen based on layout information by remote control operation.

However, this method assumes that a predetermined character string and image data are involved in the program as data broadcast together with layout information. The user must continuously operate the remote controller to display information to be checked. Since information is superposed on a different division screen, the different division screen is hidden by the superposition screen and information is lost.

Another method to solve the problem is disclosed in Patent Document 2. In the method in the document, for two or more input video images, a first input video is displayed on the full screen and a subtitle area containing a character string is extracted from the second input video and the extracted character string is superposed on any desired position of the first input video.

FIGS. 3 to 5 are drawings to show an outline of processing according to the method disclosed in Patent Document 2. In the method in Patent Document 2, of two input video images A and B shown in FIG. 3(a), a character string B' is extracted from the input video B as shown in FIG. 3(b) and is superposed on the input video A as shown in FIG. 3(c). FIG. 4 shows a display example when video is assigned to each screen. In the example shown in FIG. 4, the score display portion corresponding to the character string area B in the baseball relay corresponding to the input video B is superposed on the input video A.

RELATED ART DOCUMENTS

Patent Documents

Patent Document 1: JP-A-2002-171457
Patent Document 2: JP-A-8-317301

SUMMARY OF THE INVENTION

Problems to be Solved by the Invention

In the method disclosed in Patent Document 2 described above, information to be known by the user in the input video needs to be a character string. Thus, information which is not a character string (for example, logo mark of professional baseball team, etc.,) is not contained in the character string area B'. Therefore, if information to be known by the user contains information which is not a character string, information is lost (cut); this is a problem. For example, if a symbol or a mark that cannot be extracted is used in the score display portion of the input video B shown in FIG. 4 as shown in FIG. 5(a), only the character string portion is extracted as shown in FIG. 5(b). Thus, a symbol and a mark are not superposed on the input video A as shown in FIG. 5(c).

Although the character string area B' can be superposed on any desired position of the input video A, since the input video A is full screen display, the character string area B' is superposed on any location of the input video A. Thus, partial information of the input video A is lost. For example, as shown in FIGS. 4(c) and 5(c), the character string area B' is superposed on a part of a telop of the input video A and thus information of the telop in the superposition portion is lost.

It is an object of the invention to provide a video output device and a video output method for changing the display form of supplemental information in response to the scaling factor of the display size of input video.

Means for Solving the Problems

The invention provides a video output device including a screen configuration management section that manages a placement or a scaling of a screen for displaying at least one video; an area determination section that determines a character area in an input video; a supplemental information storing section that cuts out a video on a supplemental information area including at least one character area determined by the area determination section and stores the video on the supplemental information area as supplemental information; a supplemental information display determination section that determines whether or not the supplemental information stored by the supplemental information storing section is displayed in addition to an input video based on a screen configuration managed by the screen configuration management section; and an output section that outputs the input video and the supplemental information in accordance with commands from the screen configuration management section and the supplemental information display determination section. The supplemental information display determination section determines whether the supplemental information is displayed based on a size of a character included in the character area in the input video which changes in response to the scaling managed by the screen configuration management section.

The invention provides a video output device including a screen configuration management section that manages a placement or a scaling of a screen for displaying at least one video; an area determination section that determines a character area in an input video; a communication section that acquires a character string included in at least one character area determined by the area determination section as supplemental information from an external server; a supplemental information display determination section that determines whether or not the supplemental information acquired by the communication section is displayed in addition to an input video based on the screen configuration managed by the screen configuration management section; and an output section that outputs the input video and the supplemental information in accordance with commands from the screen configuration management section and the supplemental information display determination section. When a size of a character included in the at least one character area determined by the area determination section is smaller than a threshold value, the supplemental information display determination section displays the supplemental information.

The invention provides a video output method including: determining a character area in an input video; cutting out a video on a supplemental information area including at least one character area and storing the video on the supplemental information area as supplemental information; determining whether or not to display the supplemental information in addition to an input video based on the screen configuration for defining a placement or a scaling of a screen for displaying at least one video; and outputting the input video and the supplemental information in accordance with the screen configuration and the determination result. It is determined that the supplemental information is displayed based on a size of a character included in the character area in the input video.

The invention provides a video output method including: determining a character area in an input video; acquiring a character string included in at least one character area as supplemental information from an external server; determining whether or not to display the supplemental information acquired from the external server in addition to an input video based on the screen configuration for defining a placement or a scaling of a screen for displaying at least one video; and outputting the input video and the supplemental information in accordance with the screen configuration and the determination result. When a size of a character included in the at least one character area is smaller than a threshold value, it is determined that the supplemental information is displayed.

Advantages of the Invention

According to the video output device and the video output method according to the invention, the display form of supplemental information can be changed in response to the scaling factor of the display size of input video. Thus, if screen division of a plurality of input video images is performed, the portion where crush of a character or a symbol in input video occurs can be complemented by supplemental information and loss of information that the user wants to know can be prevented.

BRIEF DESCRIPTION OF THE DRAWINGS

FIGS. 7(a) to (f) are drawings to show patterns of full screen display and two-screen display according to the first embodiment.

FIG. 8 is a drawing to show an example of a screen configuration management table held by a screen configuration management section 103.

FIGS. 9(a) to (f) are drawings to show data configuration examples of the screen configuration management table held by the screen configuration management section 103.

FIG. 15 is a drawing to show a character area table held by a supplemental information storing section 113.

FIG. 16 is a drawing to show an object area table held by the supplemental information storing section 113.

FIG. 19 is a drawing to show a character area group table held by the supplemental information storing section 113.

FIG. 24 is a drawing to show a supplemental information table held by the supplemental information storing section 113.

FIG. 29 is a drawing to show screen configuration data provided by a supplemental information providing device.

FIG. 30 is a drawing to show a display example of supplemental information based on the screen configuration data.

BEST MODE FOR CARRYING OUT THE INVENTION

Embodiments of a video output device and a video output method according to the invention will be discussed below with reference to the accompanying drawings: The video output device of each embodiment described below is a device for receiving content of a program, commercials, etc., sent through a sending station by a broadcast station and displaying the content on a display inside or outside the device.

(First Embodiment)

Figure 1:
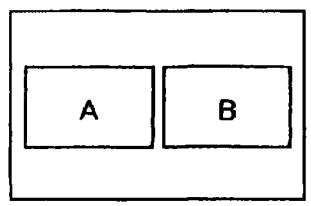
FIGS. 1(a) to (c) are drawings to show display patterns of general two-screen mode.
Figure 1:
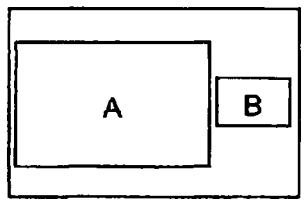
Figure 1:
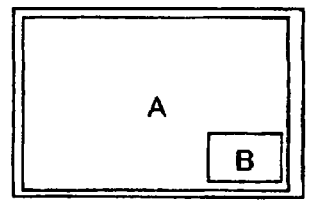
Figure 2:
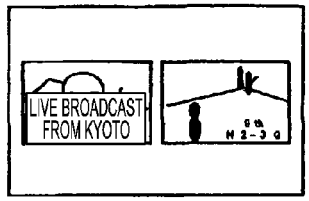
FIG. 2(a) to (c) are drawings to show display examples of assigning video to each display pattern in the two-screen mode shown in FIGS. 1(a) to (c).
Figure 2:
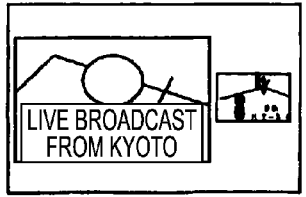
Figure 2:
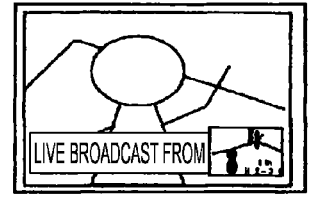
Figure 3:
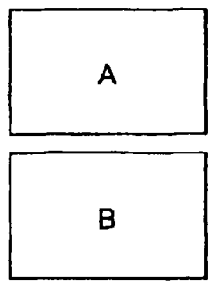
FIG. 3 is a drawing to show a display example of cutting out and superposing a part of input video B according to a method disclosed in Patent Document 2.
Figure 3:
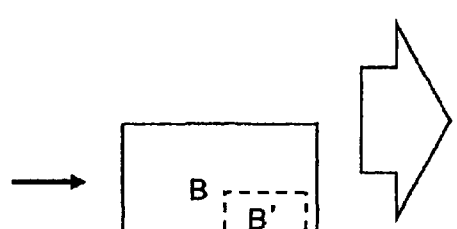
Figure 3:
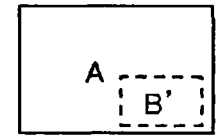
Figure 4:
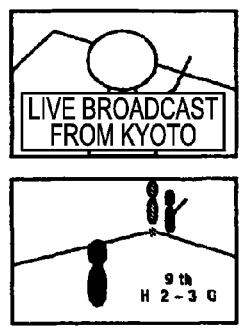
FIG. 4 is a drawing to show a display example of assigning video to each screen shown in FIG. 3.
Figure 4:
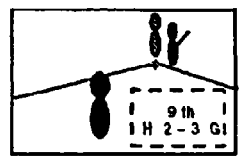
Figure 4:
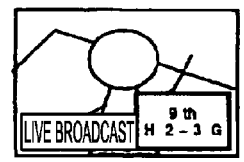
Figure 5:
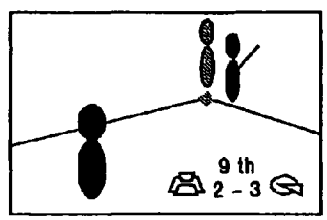
FIG. 5 is a drawing to show a display example wherein input video B contains a character string and a symbol.
Figure 5:
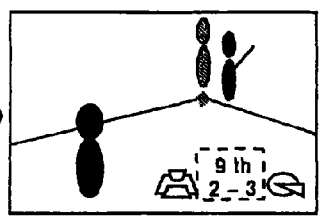
Figure 5:
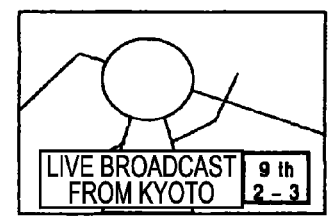
Figure 6:
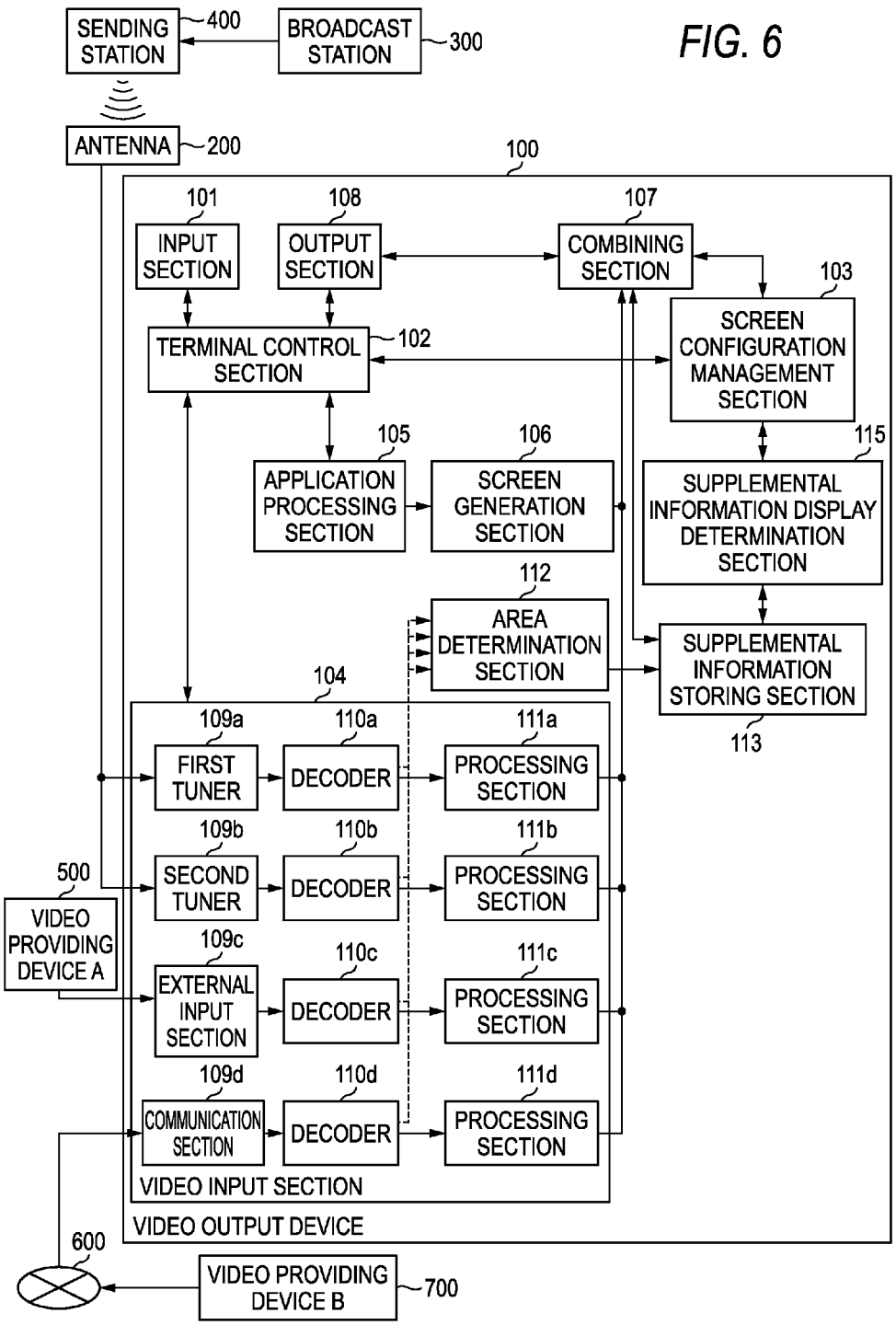
FIG. 6 is a block diagram to show a video output device of a first embodiment and its relevant devices.

FIG. 6 is a block diagram to show a video output device of a first embodiment and its relevant devices. To begin with, a processing outline until the video output device displays input video on a display will be discussed.

As shown in FIG. 6, an image output device 100 includes an input section 101, a terminal control section 102, a screen configuration management section 103, a video input section 104, an application processing section 105, a screen generation section 106, a combining section 107, an output section 108, an area determination section 112, a supplemental information storing section 113, and a supplemental information display determination section 115.

The input section 101 receives a control instruction signal from a remote control device (simply called "remote controller") attached to the image output device 100 or an external connection device, etc., and transfers the signal to the terminal control section 102. The terminal control section 102 sends an inquiry of the screen configuration responsive to the control instruction signal transferred from the input section 101 to the screen configuration management section 103. The screen configuration is, for example, the configuration of displaying the last viewed channel on the full screen in accordance with a power on instruction of the image output device 100, the configuration of scaling down the current broadcast for display and displaying a program guide on the full screen in accordance with a program guide display instruction, etc. The screen configuration management section 103 manages the configuration of a screen displayed on the display. The screen configuration management section 103 stores a screen configuration management table described later.

When a program guide display instruction signal is input to the input section 101, the terminal control section 102 transfers the program guide display instruction to the application processing section 105. The application processing section 105 can execute applications for realizing various functions in addition to a program guide display function. The application processing section 105 returns processing required for the terminal control section 102 (for example, scaling down of the current channel for display, etc.,) in response to the instruction input from the terminal control section 102. The application processing section 105 provides information required for generating a screen required for setting responsive to the instruction from the terminal control section 102 for the screen generation section 106. The functions realized by applications that can be executed by the application processing section 105 are not only the program guide display function, but also a broadcast reception setting function, an image quality adjustment function, an alarm setting function, a calendar display function, a network connection setting function, etc., for example.

The screen generation section 106 performs drawing processing of basic parts (character string, image, background color, etc.,) combined into a screen based on the information provided from the application processing section 105.

The video input section 104 manages at least one of video sources that can be input by the image output device 100 and transfers input video obtained in response to a command from the terminal control section 102 to the combining section 107. In the embodiment, the video input section 104 has, for example, a first tuner 109a, a second tuner 109b, an external input section 109c, a communication section 109d, decoders 110a to 110d, and processing sections 111a to 111d.

The first tuner 109a and the second tuner 109b receive content of a program, commercials, etc., sent through a sending station 400 by a broadcast station 300 through an antenna 200. The external input section 109c acquires content output from a video providing device 500 of a recorder having a record medium or any other video device, etc. Further, the communication section 109d receives content transmitted from a video providing device 700 through a network 600. The decoders 110a to 110d decode signals from the first tuner 109a, the second tuner 109b, the external input section 109c, and the communication section 109d respectively. The processing sections 111a to 111d perform processing of changing a cast of video, the scaling factor, etc., in response to a command from the terminal control section 102 using video data from the corresponding decoders 110a to 110d and transfer to the combining section 107.

The combining section 107 combines video transferred from the video input section 104 based on setting of the screen configuration management section 103 and output the combined video (which will be hereinafter called "resultant video") to the output section 108. Specifically, the combining section 107 combines each input video scaled down at the scaling factor required from the terminal control section 102 by the processing sections 111a to 111d in the screen configuration based on the layout specified for the screen configuration management section 103 from the application processing section 105.

If the image output device 100 includes a display, the output section 108 displays the resultant video on the display; if the image output device 100 does not include a display, the output section 108 transfers the resultant video to an external display.

The area determination section 112, the supplemental information storing section 113, and the supplemental information display determination section 115 included in the image output device 100 will be discussed in detail based on a specific example of extraction processing and display processing of supplemental information. FIGS. 7(a) to (f) are drawings to show patterns of full screen and two-screen display according to the first embodiment. FIG. 8 is a drawing to show an example of a screen configuration management table held by the screen configuration management section 103.

FIG. 7(a) shows a state in which input video 1 received by the first tuner 109a is displayed on the full screen of the display as the initial state (full screen display state of only a drama program). FIG. 7(b) shows a state in which input video 1 received by channel change of the first tuner 109a is displayed on the full screen of the display by channel change when the user gives a channel change command using the remote controller (full screen display state of only a baseball relay).

FIG. 7(c) shows a state in which when the user gives a two-screen display command using the remote controller, the previously selected channel (drama) as input video 1 and the current selected channel (baseball relay) as input video 2 are displayed at the screen ratio of one to three (two-screen display state A).

FIG. 7(d) shows a display example in which when the user can change the left-right screen ratio as desired operating a left-right button of the remote controller, the user increases the ratio of the left screen and sets the screen ratio of the left screen and the right screen to the same ratio. In the display screen, it is determined that the user cannot determine the batter score (the character string and the symbol) of the baseball relay of the right screen (input video 2) in the division screen. Thus, in the display example, the screen of the area indicating the batter score of the right screen (input video 2) is displayed in the actual size as supplemental information in the proximity of the right screen (input video 2) (two-screen display state B).

FIG. 7(e) shows a display example in which the ratio of the left screen is set large. In the display example, it is determined that the user cannot determine progress information (character string and symbol displayed in the lower right portion of the screen) of the baseball relay of the right screen (input video 2) in the division screen. Thus, in the display example, in addition to a screen of an area indicating the batter score, a screen of an area indicating the progress information of the right screen (input video 2) is also displayed in the actual size as supplemental information in the proximity of the right screen (input video 2) (two-screen display state C).

FIG. 7(f) shows a display example in which the ratio of the left screen is maximized. In the display example, the baseball relay of the right screen (input video 2) is minimized to the level such that the general situation in which the batter swings, etc., can be determined. However, the screens of the areas indicating the batter score and the progress information are displayed in the actual size as they are superposed on a part of the left screen as supplemental information (input video 1) (two-screen display state D).

In the description, the previously selected channel is input video 1 and the current selected channel is input video 2. However, for selection of input video for the channel, the current selected channel may be input video 1 received by the first tuner 109a and the last channel selected by the user in the second tuner 109b may be input video 2. The user may select either the left or the right for change.

The screen ratio when a two-screen display command is given is not limited to one to three and may be set to any ratio. In the description, the left and right screen ratio can be changed as desired operating the left-right button of the remote controller, but any input means such as another button or a touch sensor or an acceleration sensor installed in the remote controller may be used. Further, FIG. 7(f) shows an example in which the screens of the areas indicating the batter score and the progress information of supplemental information are superposed on a part of the left screen (input video 1). However, enlarging of the left screen may be controlled so that the screen indicating the supplemental information is not superposed on the left screen. When the screen indicating the supplemental information is superposed on the left screen, the transparency of the screen indicating the supplemental information may be lowered. At this time, the user can also check input video 1 of the overlap portion of the screen indicating the supplemental information.

FIG. 8 shows a data configuration example of the screen configuration management table held by the screen configuration management section 103 in the state shown in FIG. 7(a). As shown in FIG. 8, an input source, an output flag, a width (W) and a height (H) indicating the drawing area of a screen, a drawing position of a horizontal axis (X), a drawing position of a vertical axis (Y), depth indicating a superposition layer indicating overlap of video images (Z), transparency of the screen indicating in the range of 0 to 255 ($\alpha$), and scaling factor (R) relative to a full size are set in the screen configuration management table for each input video. As the transparency ($\alpha$) is closer to 0, transparency is higher.

The state shown in FIG. 7(a) is a state in which only input video 1 received by the first tuner 109a is displayed. Therefore, in the screen configuration management table at this time, only the output flag of input video 1 is "true" and the output flag of any other input video is "false." As the drawing area of input video 1, the width (W) is 1920, the height (H) is 1080, the drawing position of the horizontal axis (X) is 0, and the drawing position of the vertical axis (Y) is 0. Further, as the parameters indicating overlap of input video 1 and any other video, the depth (Z) is 0, the transparency ($\alpha$) of input video 1 is 255 and the scaling factor (R) is 100%. When such parameters are set, input video 1 is displayed on the full screen of the display.

FIGS. 9(a) to 9(f) show data configuration examples of the screen configuration management table corresponding to the display states in FIGS. 7(a) to 7(f). As shown in FIGS. 9(a) to 9(f), for the parameters of the screen configuration management table, if the screen configuration varies, change in the output flag, the screen configuration ratio, and the scaling varies.

Figure 10:
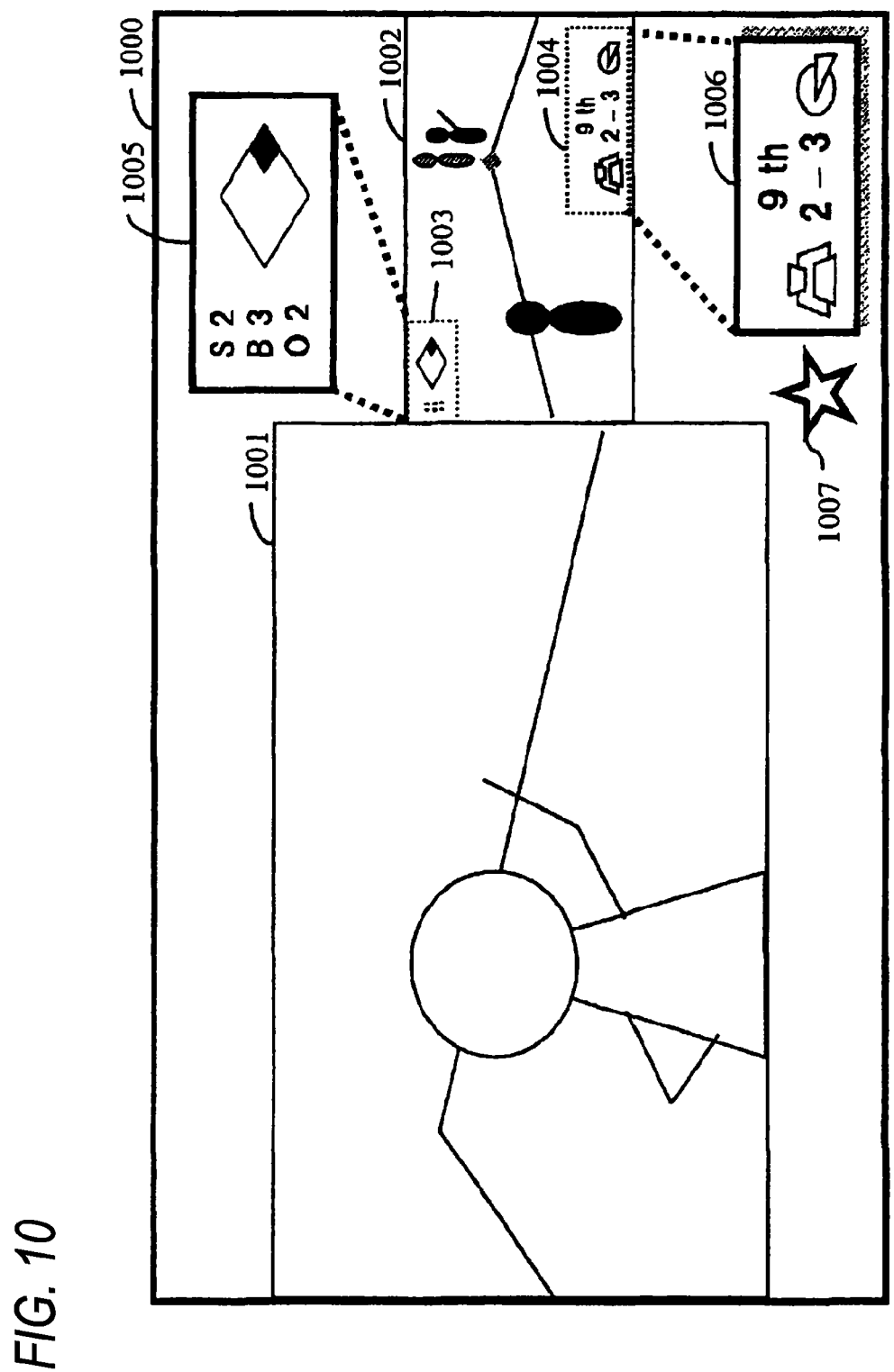
FIG. 10 is a drawing to show a display example of a supplemental information screen in two-screen display state C shown in FIG. 7(e).
Figure 11:
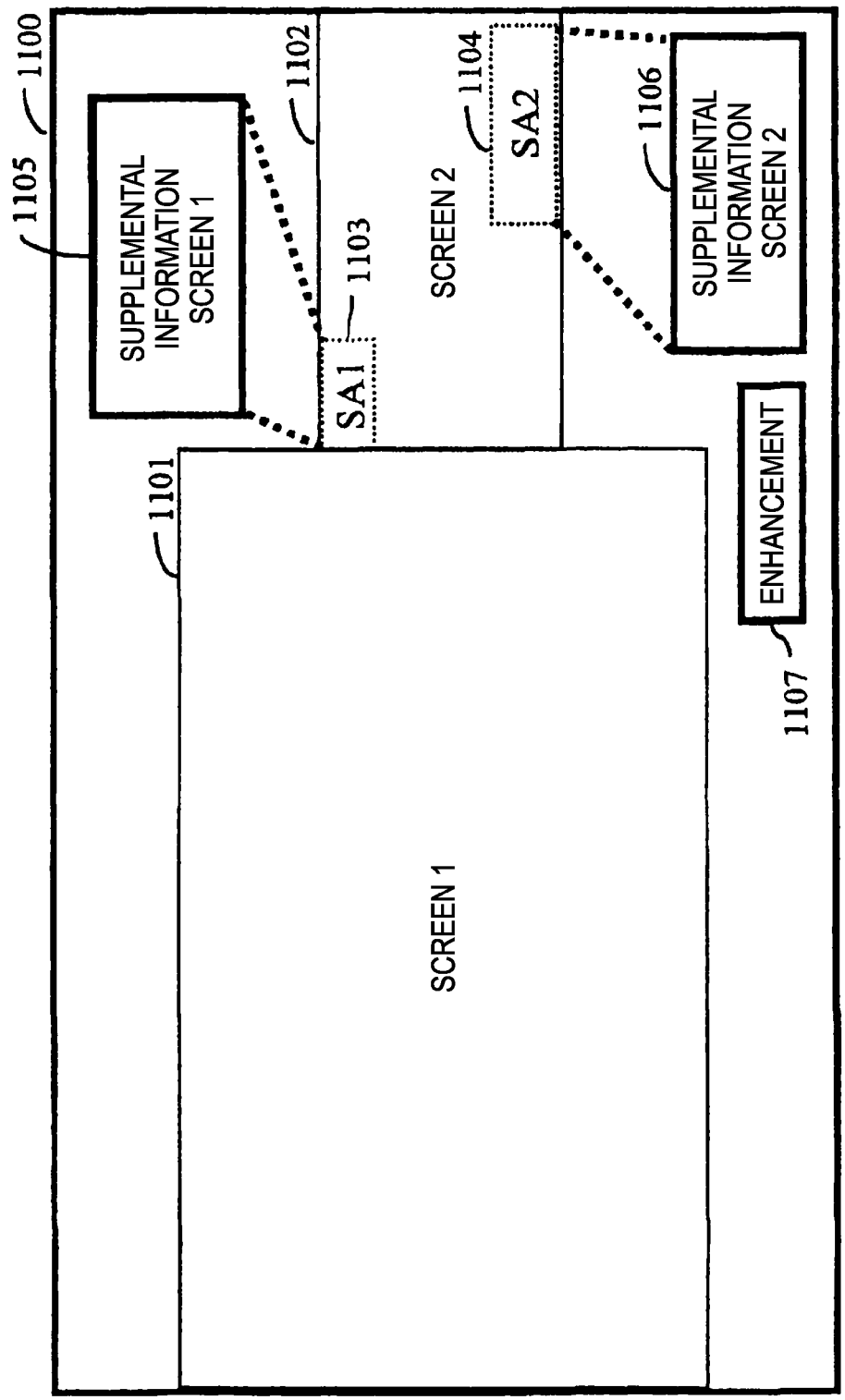
FIG. 11 is a drawing to describe screen elements shown in FIG. 10.

Next, a procedure for displaying screens indicating supplemental information on the display will be discussed with reference to FIGS. 10 to 12. FIG. 10 is a drawing to show a display example of a supplemental information screen in the two-screen display state C shown in FIG. 7(e). FIG. 11 is a drawing to describe screen elements shown in FIG. 10.

A display screen (1000/1100) is made up of input video images of two systems. A left screen (1001) is screen 1 (1101) for displaying input video 1 and a right screen (1002) is screen 2 (1102) for displaying input video 2. An area (1003) indicating the batter score of input video 2 (baseball relay) is displayed on screen 2 (1102) as input video 2 is scaled down, and thus it is determined that the area is an illegible area for the user, and the area is set to a supplemental information target area SA1. Likewise, it is determined that an area (1004) indicating progress information of input video 2 (baseball relay) is an illegible area for the user, and the area is set to a supplemental information target area SA2.

In FIGS. 10 and 11, the portion provided by cutting out and displaying the supplemental information target area SA1 is supplemental information screen 1 (1005/1105), and the portion provided by cutting out and displaying the supplemental information target area SA2 is supplemental information screen 2 (1006/1106). Further, as "enhancement representation section" (1007/1107) indicating a supplemental information screen, shadow (drop shadow) displayed on the outer frame of supplemental information screen 2 (1006) or a symbol such as an asterisk displayed on the left of supplemental information screen 2 (1006). In FIGS. 10 and 11, dotted lines are displayed from the supplemental information target area SA1 to supplemental information screen 1 and from the supplemental information target area SA2 to supplemental information screen 2. The dotted lines are shown as a guideline to indicate "which area the information is displayed in on an enlarged scale" for the user. The dotted line as a guideline is shown by way of example; it may be an arrow, a solid line, a color, light and shade, etc., if which area is indicated can be determined.

Next, processing performed by the image output device 100 for displaying the screens in FIGS. 10 and 11 on the display will be discussed in detail as "screen division mode processing," "supplemental information extraction processing," "character area group definition processing," and "supplemental information definition processing" separately.

Figure 12:
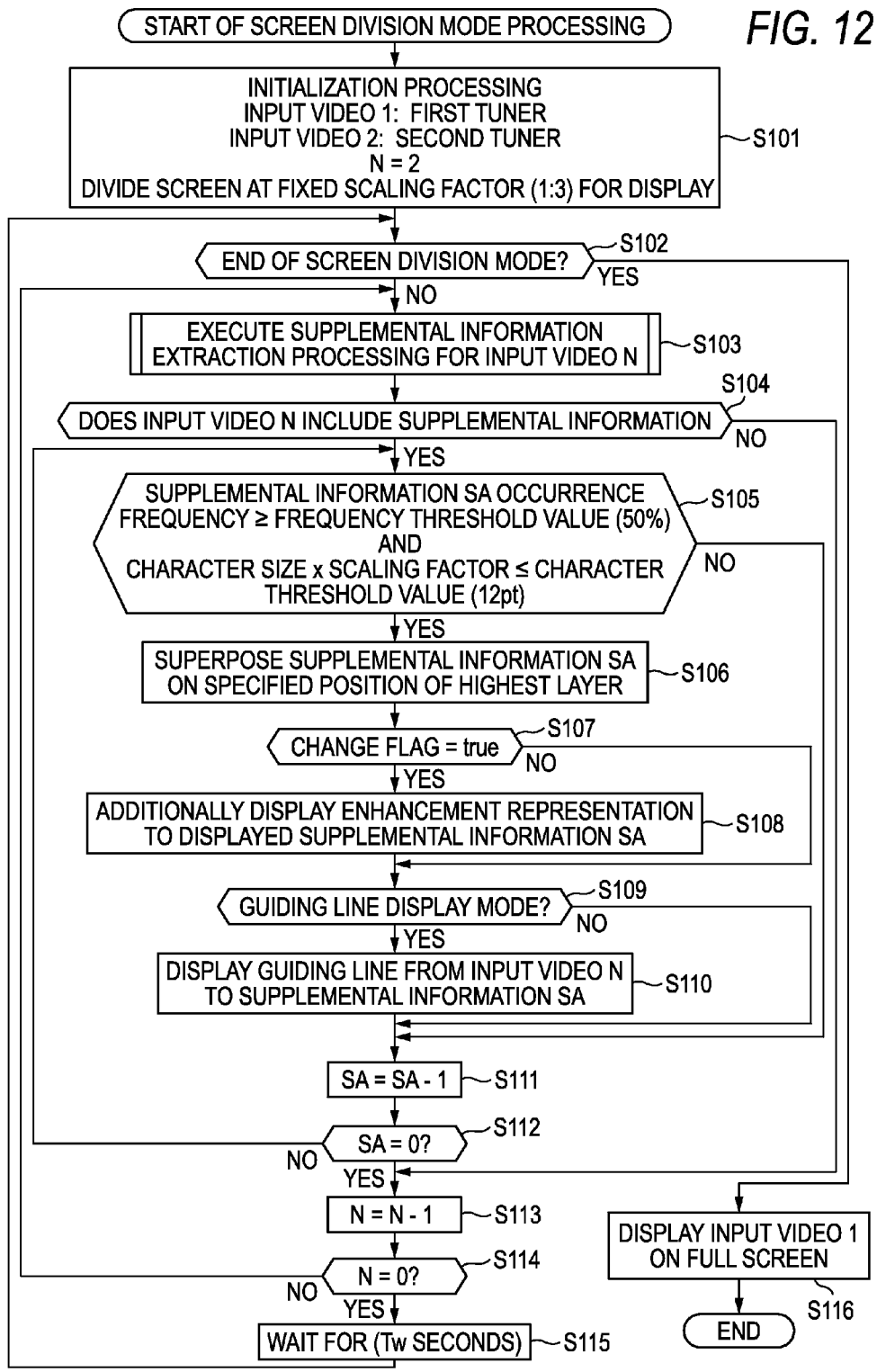
FIG. 12 is a flowchart to show processing performed by an image output device 100 in displaying a supplemental information screen in response to a screen definition request.

FIG. 12 is a flowchart to show processing performed by the image output device 100 in displaying a supplemental information screen in response to a screen definition request. First, when the user presses a "screen division mode button" of the remote controller, the input section 101 receives an instruction signal of a "screen division mode request" from the remote controller and transfers the instruction to the screen configuration management section 103 through the terminal control section 102. The screen configuration management section 103 sets the number of screen divisions (N) to "2" and determines the screen ratio at the display time (for example, fixed scaling factor 1:3 as the initial value) as initialization processing of the screen division mode processing. Further, the screen configuration management section 103 instructs the video input section 104 to output input video 1 and input video 2 from the first tuner 109a and the second tuner 109b through the terminal control section 102. The screen configuration management section 103 instructs the processing sections 111a and 111b to scale down each input video so as to become the fixed scaling factor (1:3) through the terminal control section 102 (step S101).

In the description, the initial value of the screen ratio of screen division is set to the fixed scaling factor (1:3), but may be set to the fixed scaling factor (1:1) or the user may previously specify any desired scaling factor. Further, in the description, the number of screen divisions (N) is set to "2," but may be set to more than 2 and the screen ratio can be set as desired.

If the user again presses the "screen division mode button" without waiting for display during processing at step S101, the screen configuration management section 103 terminates the screen division mode processing (Y at step S102). On the other hand, if the screen division mode is continued, the screen configuration management section 103 continues processing (N at step S102).

Next, a flow to "supplemental information extraction processing" will be discussed. At step S101, the number of screen divisions (N) is set to "2" and thus the supplemental information extraction processing is started at input image 2 indicated as N=2. First, a signal received by the second tuner 109b of the video input section 101 through the antenna 200 is decoded by the decoder 110b. Then, the decoder 110b transfers input video provided by decoding to the area determination section 112. The area determination section 112 executes supplemental information extraction processing for input video transferred from the decoder 110b (step S103). The details of the processing will be discussed later.

If a character area to be set to supplementary information exists and supplemental information is extracted as the result of the supplemental information extraction processing, the area determination section 112 stores the extracted supplementary information in the supplemental information storing section 113. If input video contains supplemental information (Y at step S104) and a predetermined determination condition is satisfied (Y at step S105), the supplemental information display determination section 115 instructs the screen configuration management section 103 to superpose the supplemental information on the specified position on the input video (highest layer) (step S106). According to the instruction, supplemental information screen 1 (1005) and supplemental information screen 2 (1006) shown in FIG. 10 are displayed on the display. The determination condition used at step S105 is "occurrence frequency of supplemental information is equal to or more than predetermined occurrence frequency threshold value (for example 50%)," "character size of extracted supplemental information×current input video scaling factor is equal to less than predetermined character size threshold value (for example, 12 points)," etc.

Next, if a change occurs in the previously held supplemental information and the current extracted supplemental information as a history of the supplemental information stored in the supplemental information storing section 113, the supplemental information display determination section 115 changes a change flag to status of "true." If the change flag is "true" (Y at step S107), the supplemental information display determination section 115 additionally displays enhancement representation to the displayed supplemental information (step S108). That is, as the enhancement representation of the supplemental information display determination section 115, shade of the outer frame of supplemental information screen 2 (1006) shown in FIG. 10 or a symbol (1007) of an asterisk, etc., is displayed. On the other hand, if the change flag is "false," the supplemental information display determination section 115 goes to the next step without displaying enhancement representation (N at step S107).

Further, the supplemental information display determination section 115 manages "guideline display mode" as setting that can be changed by the user. If the guideline display mode is set (Y at step S109), the supplemental information display determination section 115 displays a guide line connecting the supplemental information target area of input video and the supplemental information screen by dotted lines (step S110). On the other hand, if the guideline display mode is not set, the supplemental information display determination section 115 does not display a guideline and goes to the next step (N at step S019).

In the embodiment, extraction of supplemental information 1 and supplemental information 2, enhancement representation involved in supplemental information screen 2, and determination processing of component of guideline display have been described. To simplify the description, the display determination processing of supplemental information 1 and supplemental information 2 is described at the same time; however, the display determination processing for supplemental information 1 and supplemental information 2 is performed in sequence as shown at steps S111 and S112 of the flowchart of FIG. 12. Further, the display determination processing of input video 1 is performed following the display determination processing of input video 2 as shown at steps S113 and S114. The order of the display determination processing depends on implementation. For example, at step S114, if the display determination processing for input video 1 is not executed (N at step S114), the process returns to step S103 for input video 1. Since an appropriate character area does not exist as supplemental information in input video 1 shown in FIG. 10, if step S103 is executed, supplemental information is not extracted and thus it is determined at step S104 that supplemental information does not exist (N at step S104). If the display determination processing for input video 1 and input video 2 is complete (Y at step S114), the screen 1000 containing the supplemental information screen shown in FIG. 10 is displayed on the display during predetermined wait time (Tw seconds) (step S115).

After the termination of the wait processing at step S115, if the screen division mode continues (N at step S102), the video output device 100 repeats steps S103 to S115 to update the supplemental information. On the other hand, if the screen division mode terminates (Y at step S102), the screen configuration management section 103 displays any input video (for example, input video 1) on the full screen. Thus, the screen configuration management section 103 instructs the processing section 111a of the video input section 104 to change the scaling factor and instructs the combining section 107 to change the screen configuration through the terminal control section 102. Consequently, the screen shown in FIG. 7(a) is displayed on the display (step S116).

Figure 13:
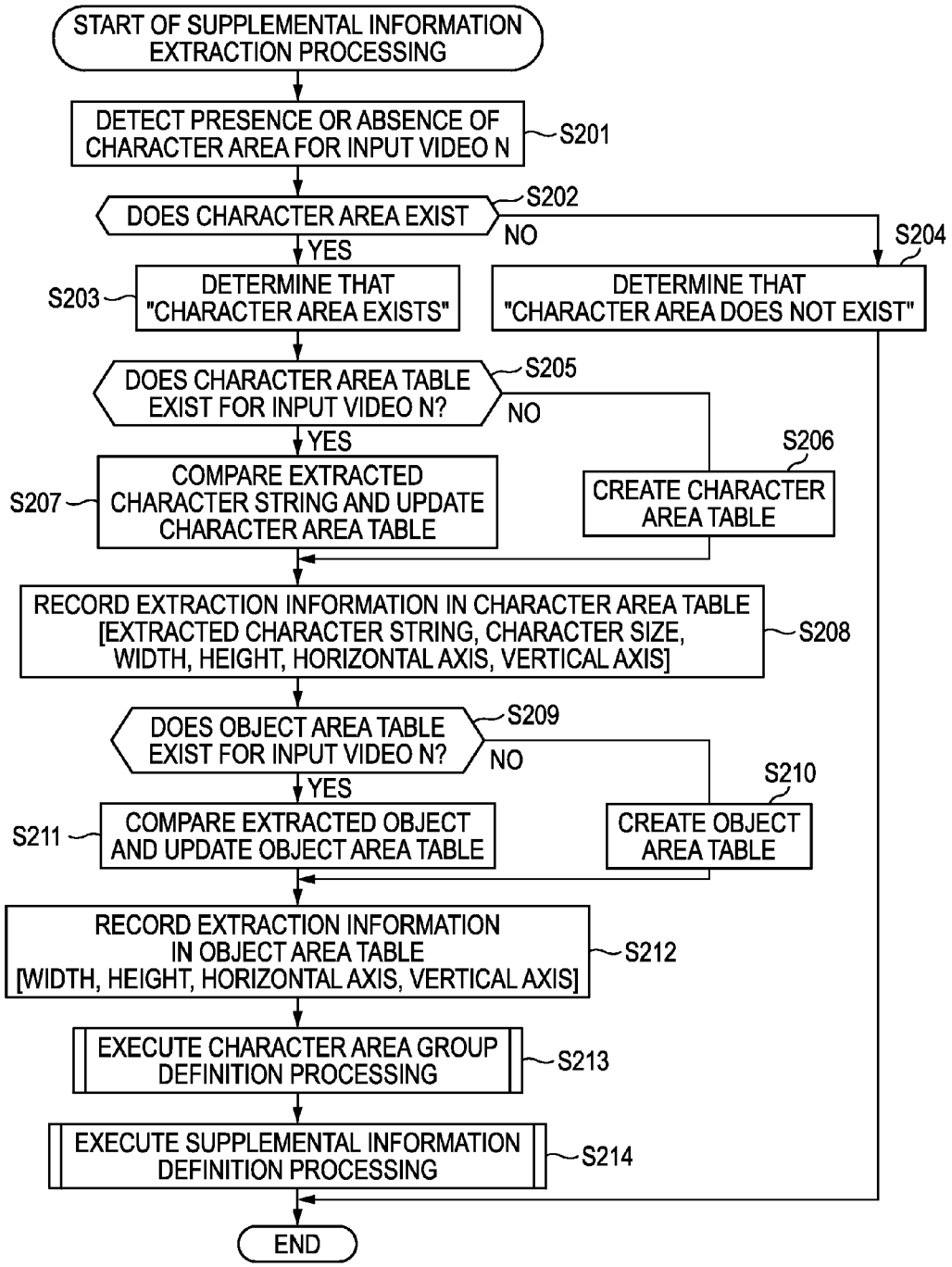
FIG. 13 is a flowchart to show supplemental information extraction processing.
Figure 14:
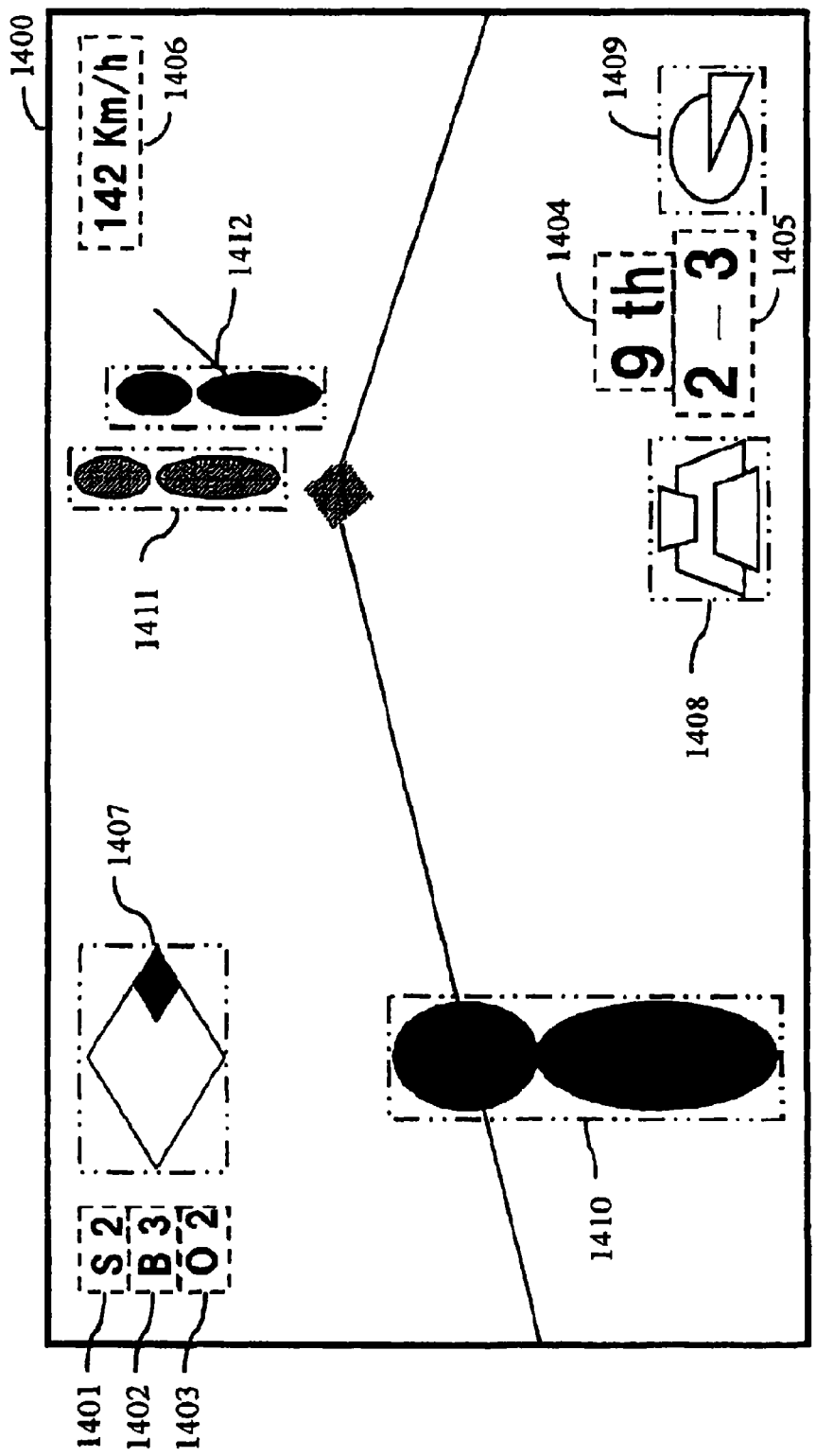
FIG. 14 is a drawing to show a character area and an object area in input video 2.
Figure 18:
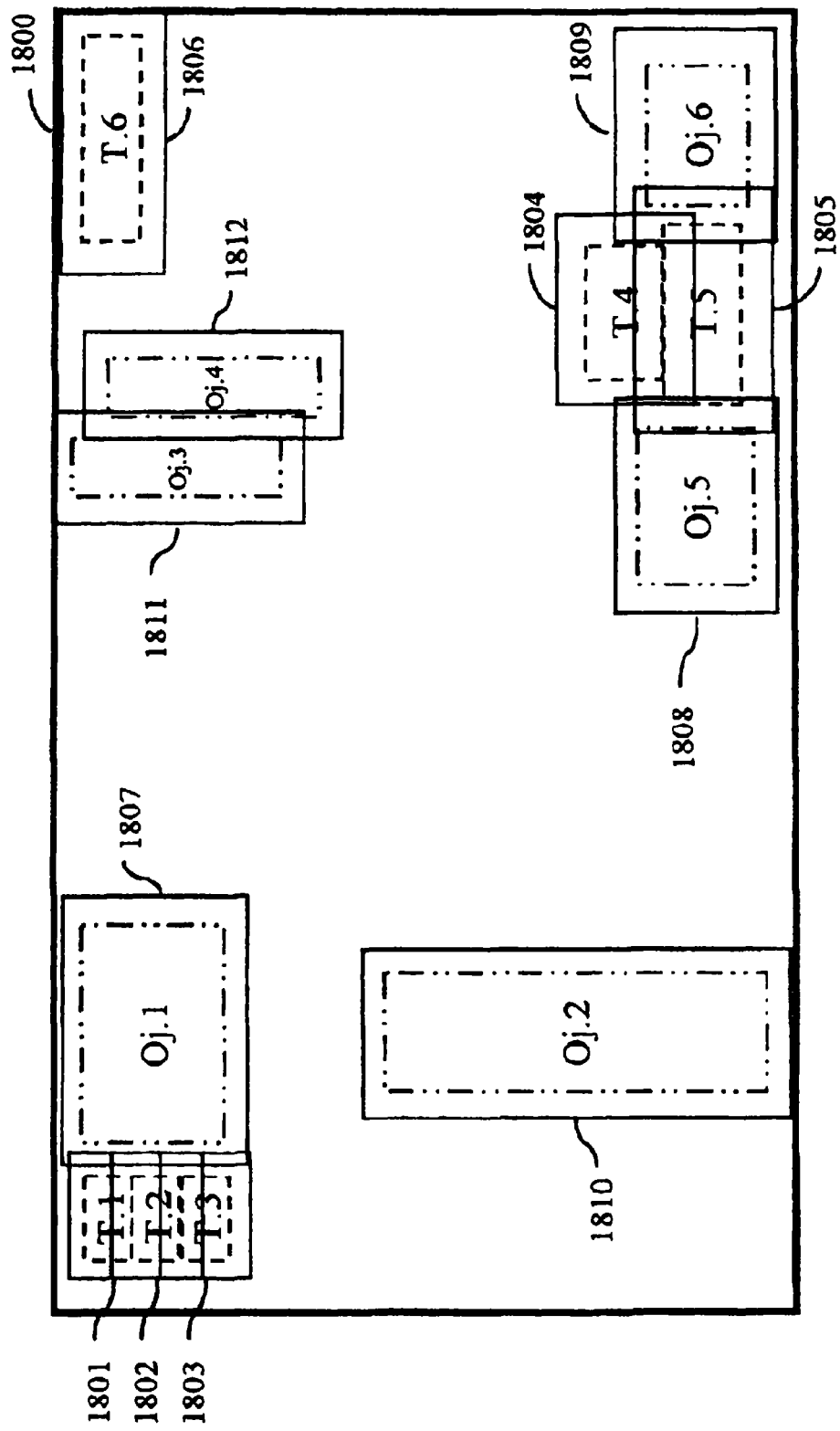
FIG. 18 is a drawing to show the superposition state of a character area and an object area in input video 2.

Next, "supplemental information extraction processing" of the area determination section 112 shown at step S103 in FIG. 12 will be discussed in detail with reference to FIGS. 13 to 15 and FIG. 18. FIG. 13 is a flowchart to show the supplemental information extraction processing. FIG. 14 is a drawing to show a character area and an object area in input video 2. FIG. 15 is a drawing to show a character area table held by the supplemental information storing section 113. FIG. 16 is a drawing to show an object area table held by the supplemental information storing section 113. FIG. 18 is a drawing to show the superposition state of a character area and an object area in input video 2.

Preprocessing of the supplemental information extraction processing shown at step S103 in FIG. 12 will be discussed with reference to the flowchart of FIG. 13. The area determination section 112 detects the presence or absence of a character area in input video 2 provided by decoding signal received by the second tuner 109b of the video input section 104 by the decoder 110b (step S201). To detect a character area by the area determination section 112, a widely known conventional art such as a method of extracting a character portion using the luminance difference is used.

If the area determination section 112 detects a character portion (Y at step S202), it determines that "character area exists" and holds the state internally (step S203). On the other hand, if the area determination section 112 does not detect a character portion (N at step S202), the area determination section 112 determines that "character area does not exist" and terminates the processing (step S204).

If a character portion exists (Y at step S202), the area determination section 112 inquires the supplemental information storing section 113 whether or not a character area table for input video exists (step S205). If response from the supplemental information storing section 113 is "character area table does not exist" (N at step S205), the area determination section 112 requests the supplemental information storing section 113 to create a new character area table (step S206). On the other hand, response from the supplemental information storing section 113 is "character area table exists" (Y at step S205), the area determination section 112 makes a comparison between the extracted character string and the previous character string and updates the character area table of the supplemental information storing section 113 (S207).

For the input video 2 shown in FIG. 14, the area determination section 112 determines and extracts the following portions as character areas. The extracted character areas are, for example, "S2 (1401)," "B3 (1402)," and "O2 (1403)" shown in the upper left corner of a screen (1400), "9th (1404)" and "2-2 (1404)" shown in the lower right portion of the screen (1400), and "142 Km/h" shown in the upper right corner of the screen (1400). As shown in FIG. 15, the area determination section 112 stores information concerning the character areas in the character area table of the supplemental information storing section 113 (step S208). Information such as the extracted character string in each character area, the character size (points), the width (W), the height (H), and the horizontal axis (X) and the vertical axis (Y) indicating the position in the screen is recorded in the character area table.

Further, the area determination section 112 detects an object which is not a character, such as a symbol or mark displayed on the screen (1400) in FIG. 14 and the screen (1800) in FIG. 18 as an object area. For example, detected object areas are a symbol (1407/1807) indicating a diamond of a baseball in the upper left portion of the screen (1400/1800), logs (1408/1808 and 1409/1809) indicating the teams of baseball in the lower right portion of the screen (1400/1800), a pitcher (1410/1810) standing on the mound in the lower left portion of the screen (1400/1800), an umpire and a batter (1411/1811 and 1412/1812) in the upper right portion of the screen (1400/1800), and the like.

If the area determination section 112 detects an object area (Y at step S209), it inquires the supplemental information storing section 113 whether or not an object area table for input video exists (step S209). If response from the supplemental information storing section 113 is "object area table does not exist" (N at step S209), the area determination section 112 requests the supplemental information storing section 113 to create a new object area table (step S210). On the other hand, response from the supplemental information storing section 113 is "object area table exists" (Y at step S209), the area determination section 112 compares the extracted object with the previous object and updates the object area table of the supplemental information storing section 113 (S211).

The area determination section 112 records the object area table as shown in FIG. 16, for example, in the supplemental information storing section 113 (S212). The object ID, the width (W) and the height (H) of each object area, and the horizontal axis (X) and the vertical axis (Y) indicating the position in the screen are recorded in the object area table.

Figure 17:
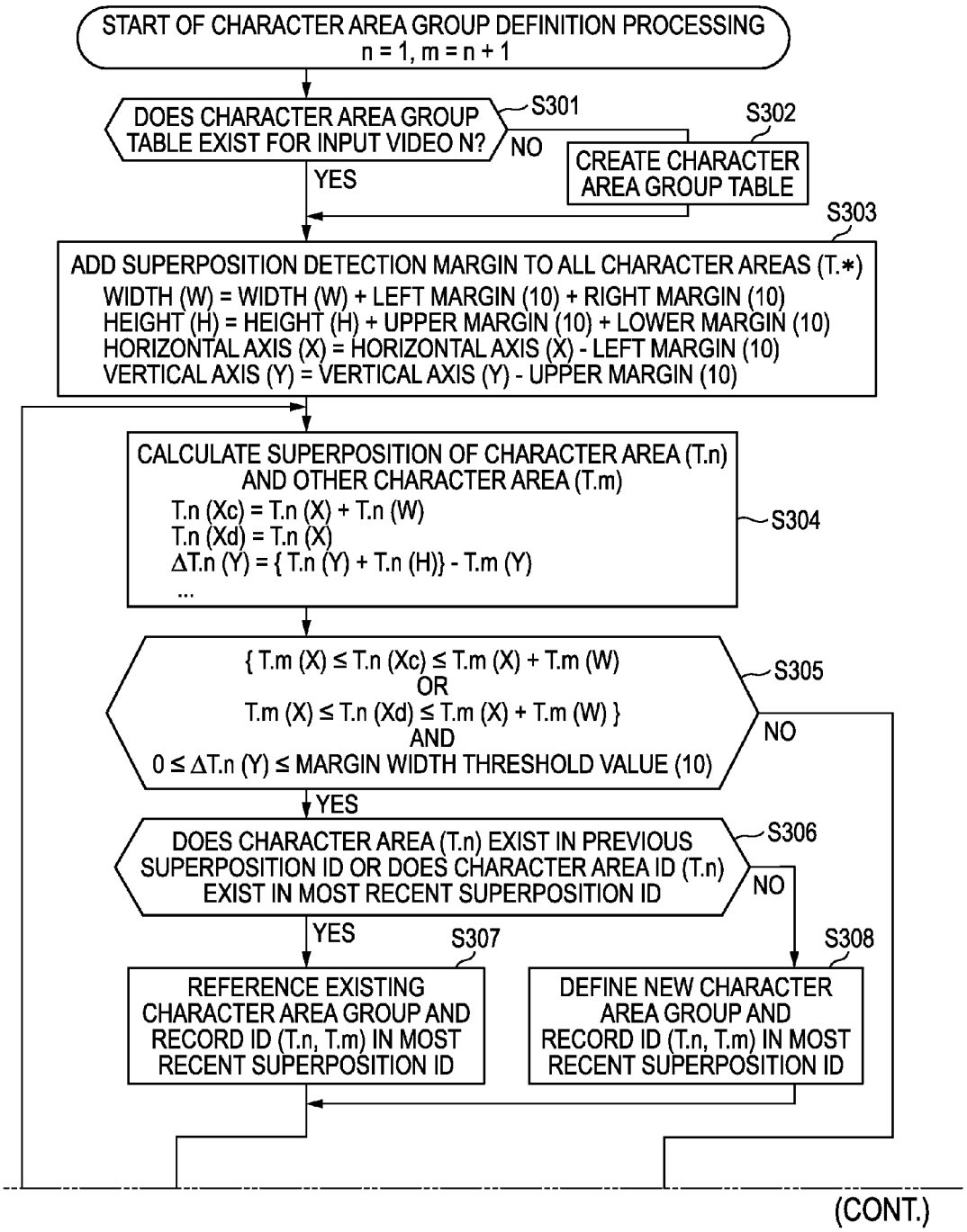
FIG. 17 is a flowchart to show character area group definition processing shown at step 213 in the flowchart of FIG. 13.
Figure 20:
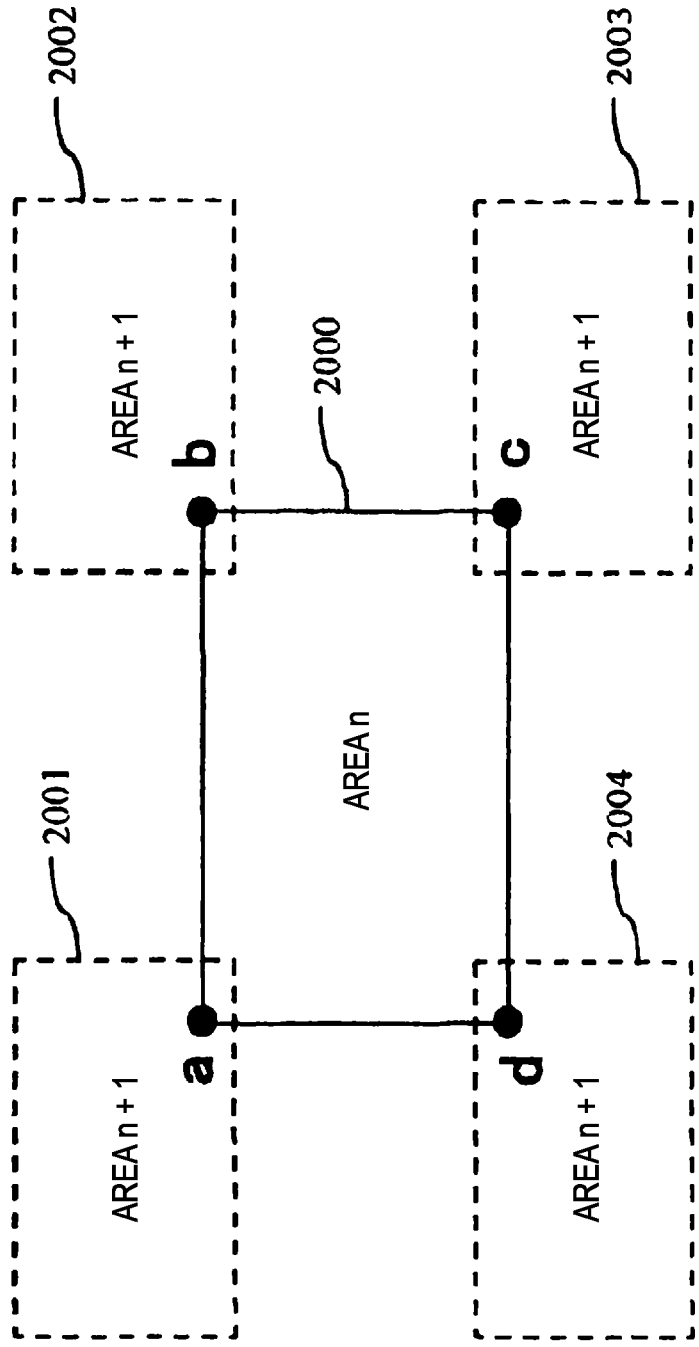
FIG. 20 is a drawing to a superposition state detection pattern.
Figure 21:
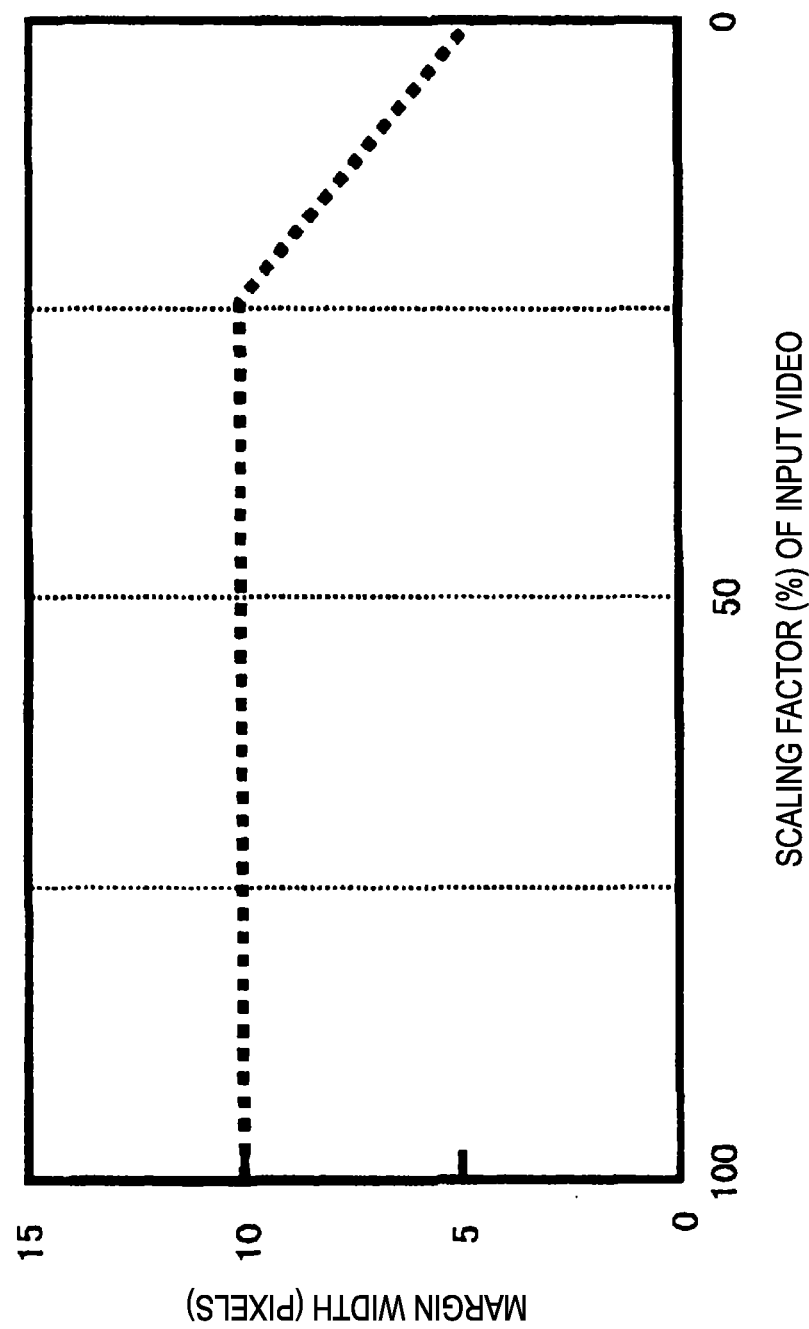
FIG. 21 is a drawing to show an example of a margin width used in internal processing.

The details of "character area group definition processing" shown at step 213 in FIG. 13 and "supplemental information definition processing" shown at step S214 will be described later with reference to FIGS. 17 to 21. FIG. 17 is a flowchart to show the character area group definition processing shown at step 213 in the flowchart of FIG. 13. FIG. 18 is a drawing of associating the character areas and the object areas of the screen shown in FIG. 14 with the IDs (T.* and Oj.*) managed in the character area table and the object area table held by the supplemental information storing section 113. FIG. 19 is a drawing to show a character area group table held by the supplemental information storing section 113. FIG. 20 is a drawing to a superposition state detection pattern. FIG. 21 is a drawing to show an example of a margin width used in internal processing.

The "character area group" means a group to handle overlap of a plurality of extracted character areas as one information unit. In the first embodiment, "T.1/T.2/T.3" and "T.4/T.5" are determined overlap and "T.6" does not overlap any other character string. Definition of the three character area groups will be discussed below:

First, the area determination section 112 inquires the supplemental information storing section 113 whether or not a character area group table for input video exists. If response from the supplemental information storing section 113 is "character area group table does not exist" (N at step S301), the area determination section 112 requests the supplemental information storing section 113 to create a new character area group table (step S302). On the other hand, response from the supplemental information storing section 113 is "character area group table exists" (Y at step S301), the area determination section 112 references the character area group table (FIG. 19) held by the supplemental information storing section 113.

The area determination section 112 references the character area table shown in FIG. 15 held by the supplemental information storing section 113 and adds a superposition detection margin to all character areas (T.*) to detect a superposition state (step S303). In the embodiment, the margin width (pixel units) changing in response to the scaling factor of input video, for example, as shown in FIG. 21 is preset. For example, assuming that when the scaling factor of the input video is 25%, the margin width is 10 pixels, superposition detection margin is calculated according to the following calculation expression:

Width ($W$)=width ($W$)+left margin (10)+right margin (10)

Height ($H$)=height ($H$)+upper margin (10)+lower margin (10)

Horizontal axis ($X$)=horizontal axis ($X$)−left margin (10)

Vertical axis ($Y$)=Vertical axis ($Y$)−upper margin (10)

FIG. 20 is a drawing to show a pattern when superposition state of area n and area n+1. Four sides of "a" to "d" exist in area n and the superposition state with area n+1 to be checked need to be checked for all the four sides. However, in the description to follow, to simplify the description, only "overlap of the lower side of T.1 (1801) and the upper side of T.2 (1802)" of "S2 (1401)" and "B3 (1402)" extracted from input video 2 shown in FIG. 14, namely, "T.1 (1801)" and "T.2 (1802)" shown in the screen (1800) in FIG. 18 will be discussed. Only portions where apex T.1$c$ and apex T.1$d$ of T.1 (area n) in FIG. 20 overlap apex T.2$a$ and apex T.2$d$ of T.2 (area n+1) will be discussed and other overlap portions will not be discussed. Algorithm for detecting overlap of dispersed objects on a two-dimensional plane is not limited to that in the first embodiment and any other method may be used.

The area determination section 112 detects superposition using the following calculation expressions for the character area after a margin is added to each of the lower side of T.1 and the upper side of T.2 to be checked at present:

$T.n(Xc)=T.n(X)+T.n(W)$ $T.n(Xd)=T.n(X)$ $\Delta T.n(Y)=\{T.n(Y)+T.n(H)\}-T.m(Y)$ In the expressions, it is assumed that m=n+1 and T.n indicates T.1 and T.m indicates T.2. It is assumed that "Xc" is assignment of a numeric value of the horizontal axis (X) at apex c of T.1, "Xd" is assignment of a numeric value of the horizontal axis (X) at apex d of T.1, and "T.m (Y)" is assignment of a numeric value of the vertical axis (Y) at apex a (or b) of T.2 (step S304).

Next, the area determination section 112 uses the following determination expression to determine overlap of the lower side of T.1 and the upper side of T.2:

$\{T.m(X) \leq T.n(Xc) \leq T.m(X)+T.m(W)$ or $T.m(X) \leq T.n(Xd) \leq T.m(X)+T.m(W)\}$ and $0 \leq \Delta T.n(Y) \leq$ margin width threshold value (10)

The expression means that either of "apex c of T.1 exists between apexes a and b of T2" and "apex d of T.1 exists between apexes a and b of T2" and "the difference between the positions of the lower side of T.1 and the upper side of T.2 indicated by $\Delta T.n$ (Y) is equal to or more than 0 or is equal to or less than predetermined margin width threshold value." If the expression is satisfied, the area determination section 112 determines that the lower side of T.1 and the upper side of T.2 overlap (step S305).

If it is determined that the characters to be checked overlap (Y at step 305), the area determination section 112 references the character area group table of the supplemental information storing section 113. If the area determination section 112 determines that "character area ID (T.n) exists in previous superposition ID" or "character area ID (T.n) exists in most recent superposition ID" (Y at step S306), the area determination section 112 references existing character area group and records the character area IDs (T.n and T.m) in the most recent superposition ID (step S307). If the area determination section 112 determines that "character area ID (T.n) exists in neither of superposition IDs" (N at step S306), the area determination section 112 defines a new character area group and records character area IDs (T.n and T.m) in the most recent superposition ID (step S308).

If the area determination section 112 determines that the determination expression is not satisfied (N at step S305), the area determination section 112 determines that the lower side of T.1 and the upper side of T.2 do not overlap, and references the character area group table held by the supplemental information storing section 113. If the area determination section 112 determines that "character area ID (T.n) is recorded in the previous superposition ID" (Y at step 309), the area determination section 112 references existing character area group and records only the character area ID (T.n) in the most recent superposition ID (step S310). On the other hand, if the area determination section 112 determines that "character area ID (T.n) is not recorded in the previous superposition ID" (N at step 309), the area determination section 112 defines a new character area group and records only the character area ID (T.n) in the most recent superposition ID (step S311).

Thus, the area determination section 112 changes the character area (T.m) to be calculated in the superposition state according to a calculation expression of (m=m+1), etc., for the character area (T.n) to be checked (step 312). If calculation target remains, the process returns to step S304 (N at step S313). After the superposition state is confirmed for all calculation targets (T.m) (Y at step S313), the area determination section 112 confirms the superposition state for the next character area to be checked (T.n+1) (step S314 and N at S315). Last, the area determination section 112 confirms the superposition state of all character areas for input video (Y at step S315). Then, the area determination section 112 calculates and records the smallest character size (pt: Point units) in the most recent superposition ID (T.*) referenced by each character area group (Tx.*) of the character area group table held by the supplemental information storing section 113 (step S316). Further, the area determination section 112 calculates a rectangle including each character area in the most recent superposition ID (T.*) referenced by each character area group (Tx.*) and records in the character area group table (step S317). Thus, the character area group table as shown in FIG. 19 is complete.

Figure 22:
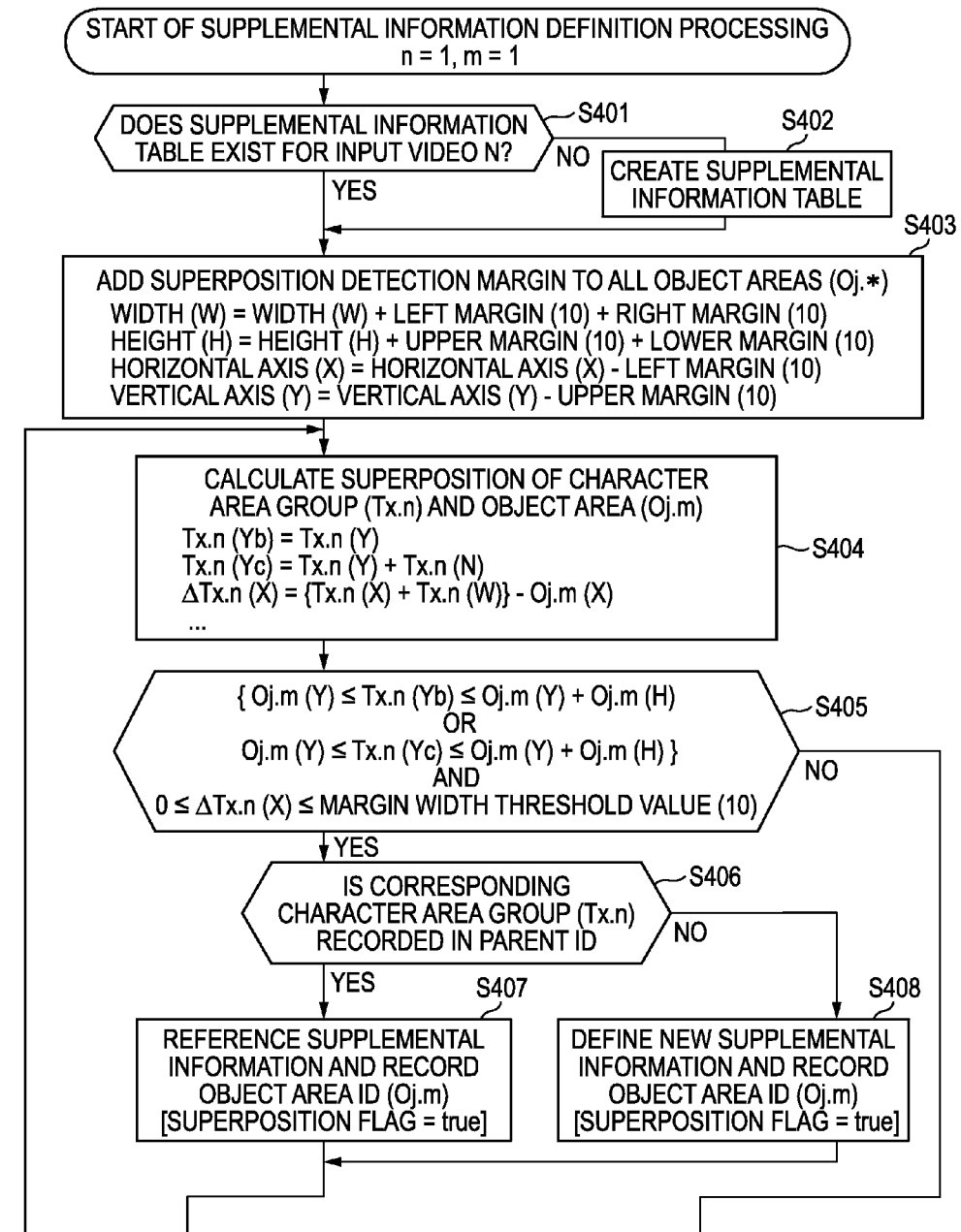
FIG. 22 is a flowchart to show the supplemental information definition processing shown at step S214 in the flowchart of FIG. 13.
Figure 23:
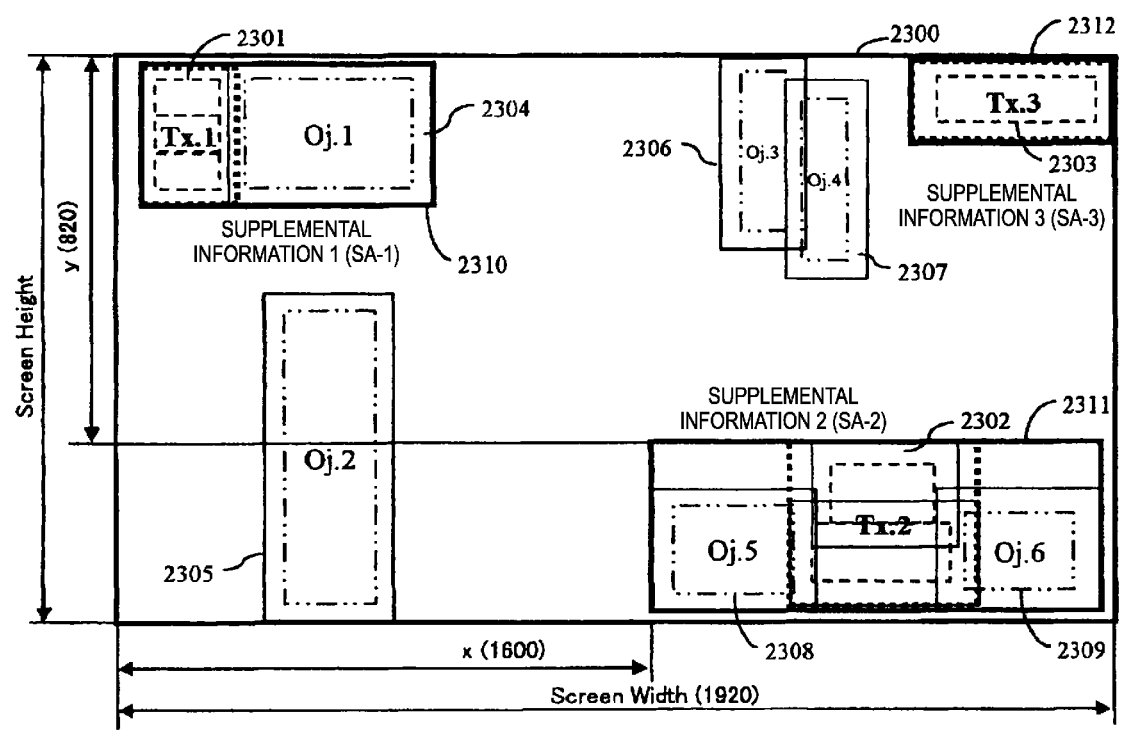
FIG. 23 is a drawing to show definition of character area group area and supplemental information area in input video 2.

Next, "supplemental information definition processing" shown at step S214 in FIG. 13 will be discussed in detail with reference to FIGS. 22 to 24. FIG. 22 is a flowchart to show the supplemental information definition processing shown at step S214 in the flowchart of FIG. 13. FIG. 23 shows definition of character area group area and supplemental information area in input video 2. FIG. 23 is drawing of associating the character area groups, the object areas, and the supplemental information of the screen shown in FIGS. 14 and 18 with the IDs (T.*, Oj.*, and SA-*) managed in the character area group table and the object area table held by the supplemental information storing section 113. FIG. 24 is a drawing to show a supplemental information table held by the supplemental information storing section 113.

The supplemental information definition processing shown at step S214 in FIG. 13 will be discussed. The "supplemental information" is a unit of information with an extracted character area group as a base and information overlapping an object area can be collectively handled as one information unit. In the example shown in FIG. 23, "Tx.1 (2301)" of the screen (2300) is determined supplemental information 1 (SA-1: 2310) overlapping "Oj.1 (2304)" and "Tx.2 (2302)" is determined supplemental information 2 (SA-2: 2311) overlapping "Oj.5 (2308)" and "Oj.6 (2309)." "Tx.3 (2303) is determined supplemental information 3 (SA-3: 2312) not overlapping any other object area. Definition of the three pieces of supplemental information will be discussed below:

First, the area determination section 112 inquires the supplemental information storing section 113 whether or not a supplemental information table for input video exists. If response from the supplemental information storing section 113 is "supplemental information table does not exist" (N at step S401), the area determination section 112 requests the supplemental information storing section 113 to create a new supplemental information table (step S402). On the other hand, response from the supplemental information storing section 113 is "character area group table exists" (Y at step S401), the area determination section 112 references the supplemental information table (FIG. 24) held by the supplemental information storing section 113.

The area determination section 112 references the character area group table and the object area table held by the supplemental information storing section 113 and adds a superposition detection margin to all object area groups (Oj.*) to detect a superposition state (step S403). The margin width (pixel units) changing in response to the scaling factor of input video, for example, as shown in FIG. 21 is preset. For example, assuming that when the scaling factor of the input video is 25%, the margin width is 10 pixels, superposition detection margin is calculated according to the following calculation expression:

Width $(W)$=width $(W)$+left margin (10)+right margin (10)

Height $(H)$=height $(H)$+upper margin (10)+lower margin (10)

Horizontal axis $(X)$=horizontal axis $(X)$−left margin (10)

Vertical axis $(Y)$=Vertical axis $(Y)$−upper margin (10)

In the description to follow, to simplify the description, only "overlap of the right side of Tx.1 and the left side of Oj.1" of "Tx.1 (2301)" and "Oj.1 (2304)" shown in FIG. 23 will be discussed as with the character area group extraction processing described above. That is, only portions where right sides Tx.1b and Tx.1c of Tx.1 (area n) in FIG. 20 overlap left sides Oj.1a and Oj.1d of Oj.1 (area n+1) will be discussed and other overlap portions will not be discussed.

The area determination section 112 detects superposition using the following calculation expressions for the object area after a margin is added to each of the right side of Tx.1 and the left side of Oj.1 to be checked at present:

$Tx.n(Yb)=Tx.n(Y)$ $Tx.n(Yc)=Tx.n(Y)+Tx.n(N)$ $\Delta Tx.n(X)=\{Tx.n(X)+Tx.n(W)\}-Oj.m(X)$ In the expressions, it is assumed that m=1 and Tx.n indicates Tx.1 and Oj.m indicates Oj.1. It is assumed that "Yb" is assignment of a numeric value of the vertical axis (Y) at apex b of Tx.1, "Yc" is assignment of a numeric value of the vertical axis (Y) at apex c of Tx.1, and "Oj.m(X)" is assignment of a numeric value of the horizontal axis (X) at apex a (or d) of Oj.1 (step S404).

Next, the area determination section 112 uses the following determination expression to determine overlap of the right side of Tx.1 and the left side of Ob.1:

$\{Oj.m(Y) \leq Tx.n(Yb) \leq Oj.m(Y)+Oj.m(H)$ or
$Oj.m(Y) < Tx.n(Yc) \leq Oj.m(Y)+Oj.m(H)\}$ and $0 \leq \Delta Tx.n(X) \leq$ margin width threshold value (10)

The expression means that either of "apex b of Tx.1 exists between apexes a and d of Oj.1" and "apex c of Tx.1 exists between apexes a and d of Oj.1" and "the difference between the positions of the right side of Tx.1 and the left side of Oj.1 indicated by $\Delta Tx.n(X)$ is equal to or more than 0 or is equal to or less than predetermined margin width threshold value." If the expression is satisfied, the area determination section 112 determines that the right side of Tx.1 and the left side of Oj.1 overlap (step S405).

If it is determined that the character area group and object area to be checked overlap (Y at step 405), the area determination section 112 references the supplement information table held by the supplemental information storing section 113. If the area determination section 112 determines that "the corresponding character area group (Tx.n) is recorded in parent ID" (Y at step S406), the area determination section 112 references existing supplemental information, records the object area ID (Oj.m), and sets a superposition flag to "true" (step S407). If "the corresponding character area group (Tx.n) is not recorded in parent ID" (N at step S406), the area determination section 112 defines new supplemental information, records the object area ID (Oj.m), and sets the superposition flag to "true" (step S408).

If the area determination section 112 determines that the determination expression is not satisfied (N at step S405), the area determination section 112 determines that the right side of Tx.1 and the left side of Oj.1 do not overlap, and references the supplemental information table held by the supplemental information storing section 113. If the area determination section 112 determines that "the corresponding character area group (Tx.n) is recorded in parent ID" (Y at step S409), the area determination section 112 references existing supplemental information, records the object area ID (Oj.m), and sets the superposition flag to "false" (step S410). On the other hand, if the area determination section 112 determines that "the corresponding character area group (Tx.n) is not recorded in parent ID" (N at step S409), the area determination section 112 defines new supplemental information, records the object area ID (Oj.m), and sets the superposition flag to "false" (step S411).

Thus, the area determination section 112 changes the object area (Oj.m) to be calculated in the superposition state according to a calculation expression of (m=m+1), etc., for the character area group (T.n) to be checked (step S412). If calculation target remains, the process returns to step S404 (N at step S413). After the superposition state is confirmed for all calculation targets (Oj.m) (Y at step S413), the area determination section 112 calculates the occurrence frequency (%) for supplemental information (SA-n) based on the cumulative total from the first creating time of the supplemental information table, and records the occurrence frequency in the supplemental information table (step S414). Then, the area determination section 112 confirms the superposition state in sequence for the next character area group to be checked (Tx, n+1) (step S415 and N at S416). Last, the area determination section 112 confirms the superposition state of all character area groups for input video (Y at step S416). Then, the area determination section 112 calculates a rectangle including overlap of each character area group (Tx.*) held by the supplemental information storing section 113 and superposed object area (Oj.*) and records in the supplemental information table (step S417). Thus, the character area group table as shown in FIG. 24 is complete.

As described above, the area determination section 112 performs processing according to the flowcharts shown in FIGS. 12, 13, 17, and 22, whereby the supplemental information table shown in FIG. 24 is created or updated and is held in the supplemental information storing section 113. The area determination section 112 repeats the processing every wait time (Tw seconds), whereby the descriptions of the supplemental information are updated following change in the input video, so that the screen as shown in FIG. 10 is continuously displayed on the display.

Figure 25:
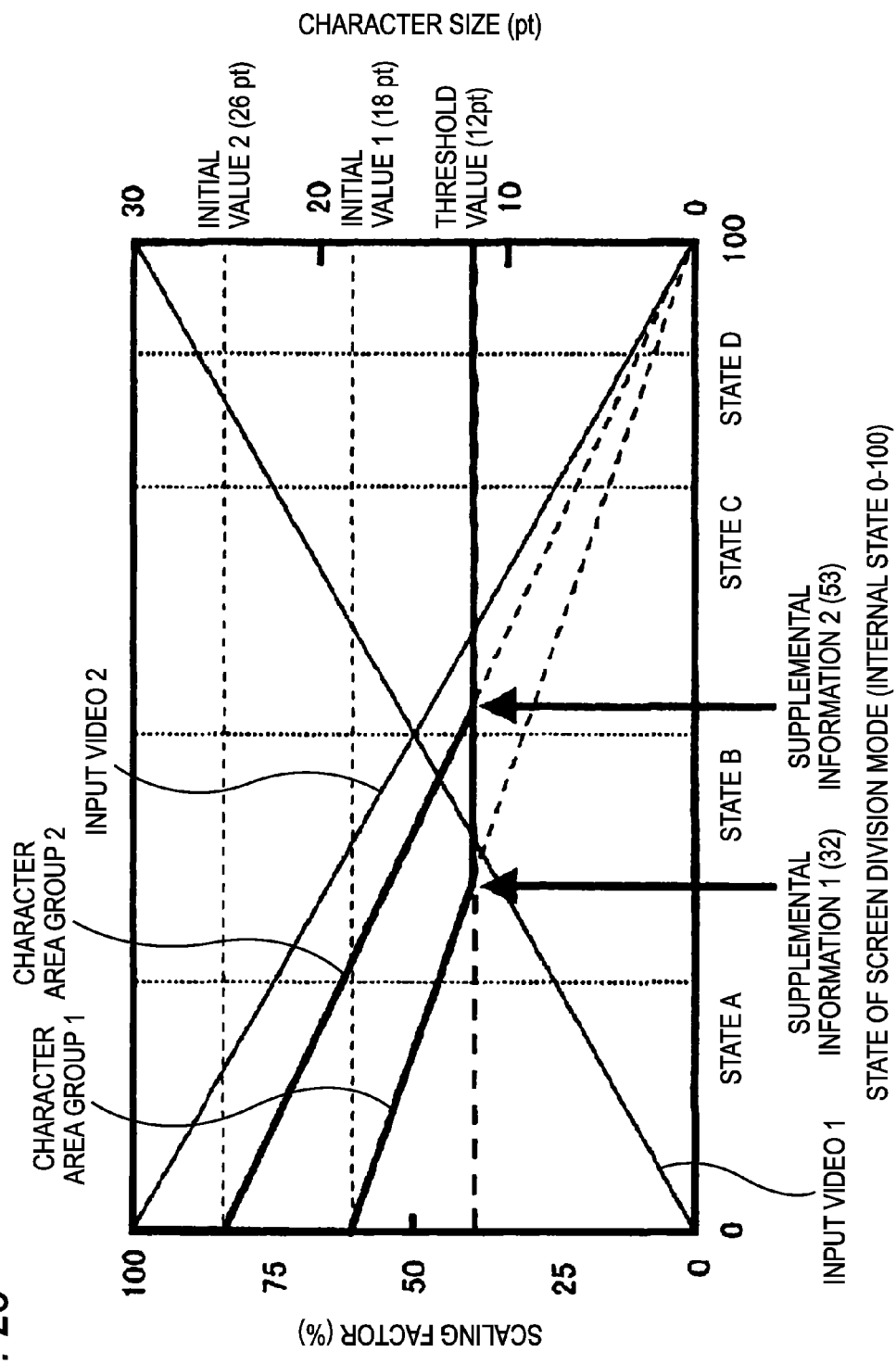
FIG. 25 is a drawing to show supplemental information display determination criterion responsive to the scaling factor and the screen division mode of input video.

The drawing timing of the supplemental information will be discussed below in detail with reference to FIG. 25. FIG. 25 is a drawing to show supplemental information display determination criterion responsive to the scaling factor and the screen division mode of the input video. In the supplemental information display determination criterion, supplemental information is displayed only if a predetermined determination condition is satisfied at step S105 shown in the flowchart of FIG. 12. The predetermined determination condition is that "occurrence frequency (%) recorded in the supplemental information table held by the supplemental information storing section 113 is equal to or more than "the threshold value of occurrence frequency (for example, 50%)" and that "character size"×"current input video scaling factor" recorded in the character area group table is equal to or less than "character threshold value (for example, 12 points)," etc.

The former condition in the supplemental information display determination criterion is a condition for determining that a character string displayed in one given time period for input video is supplemental information intended by the program providing company of a broadcast station, etc. The condition is provided, whereby information not necessarily required when the screen is divided such as a character string displayed suddenly and in a single shot like TV commercials or information provided in a baseball relay, for example, can be prevented from being displayed as supplemental information. In the first embodiment, the occurrence frequency of supplemental information 3 (SA-3: Speed of pitched ball of pitcher in baseball relay) is "12%" and thus the supplemental information display determination section 115 determines that supplemental information 3 does not satisfy the condition as the supplemental information.

The latter condition in the supplemental information display determination criterion is a condition for determining that when input video is scaled down for display, only if it is determined that the displayed character string is illegible for the user, it is displayed as supplemental information. For example, to display supplemental information, the character size when input video is displayed 100% as the initial state as shown in FIG. 25 for "two-screen display states A to D" shown in FIGS. 7(c) to 7(f) is as follows: The character size of character area group 1 (Tx.1) is "18 points" and the character size of character area group 2 (Tx.2) is "26 points." In the "two-screen display state A," the scaling factor of input video 2 is "75%," the character size of character area group 1 (Tx.1) is "about 14 points," the character size of character area group 2 (Tx.2) is "about 19 points" and exceeds the threshold value (12 points) and thus it is determined that information is legible for the user and supplemental information is not displayed (FIG. 7(c)).

Next, before the "two-screen display state B" is reached, the character size of character area group 1 (Tx.1) falls below the threshold value (12 points), the supplemental information display determination section 115 starts display of supplemental information. In the "two-screen display state B," the character size of character area group 2 (Tx.2) a little exceeds the threshold value (12 points) and thus only supplemental information 1 is displayed (FIG. 7(d)). Further, just after the "two-screen display state B" is passed through, before the "two-screen display state C" is reached, the character size of character area group 2 (Tx.2) falls below the threshold value (12 points) and thus in the "two-screen display state C," supplemental information 2 is also displayed (FIG. 7(e). Then, on and after the "two-screen display state D," both the character sizes of character area groups 1 and 2 fall below the threshold value (12 points) and thus supplemental information 1 and supplemental information 2 are continuously displayed (FIG. 7(f).

In the description, "supplemental information whose occurrence frequency is "50%" or more is displayed," but this determination criterion may be able to be changed as desired by the user. In the description, the threshold value of the character size for determining display is "12 points" by way of example, but may be able to be changed as desired by the user because the character size illegible for the user varies from one person to another. The threshold value of the character size for determining display may be determined in association with the size set in application for displaying a character string such as font size setting of a menu screen, etc., managed by the terminal system, font size setting of the browser installed in the terminal, or font size setting of EPG installed in the terminal (last setup size).

Figure 26:
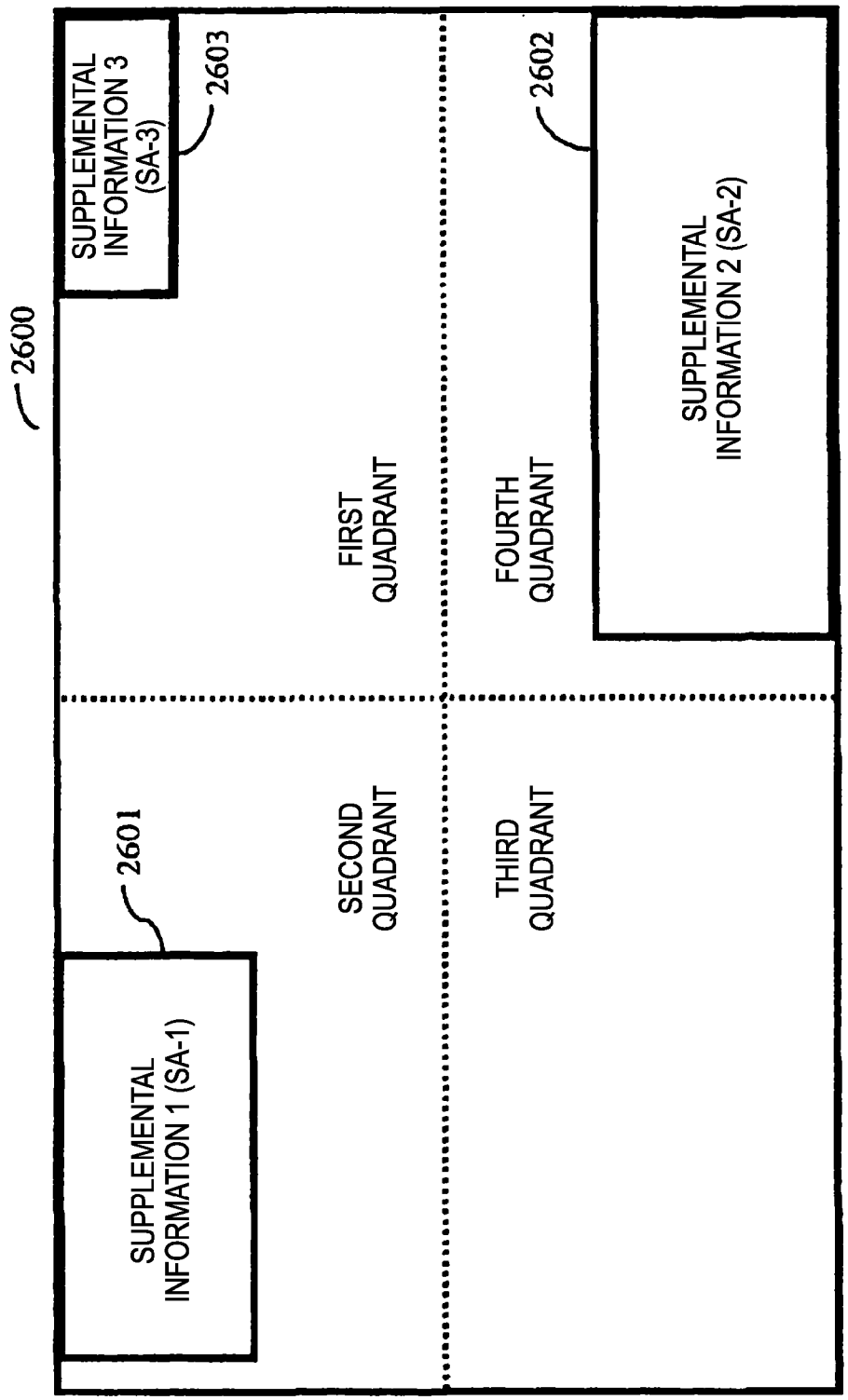
FIG. 26 is a drawing to show an example of a factor for determining the display location of supplemental information.
Figure 27:
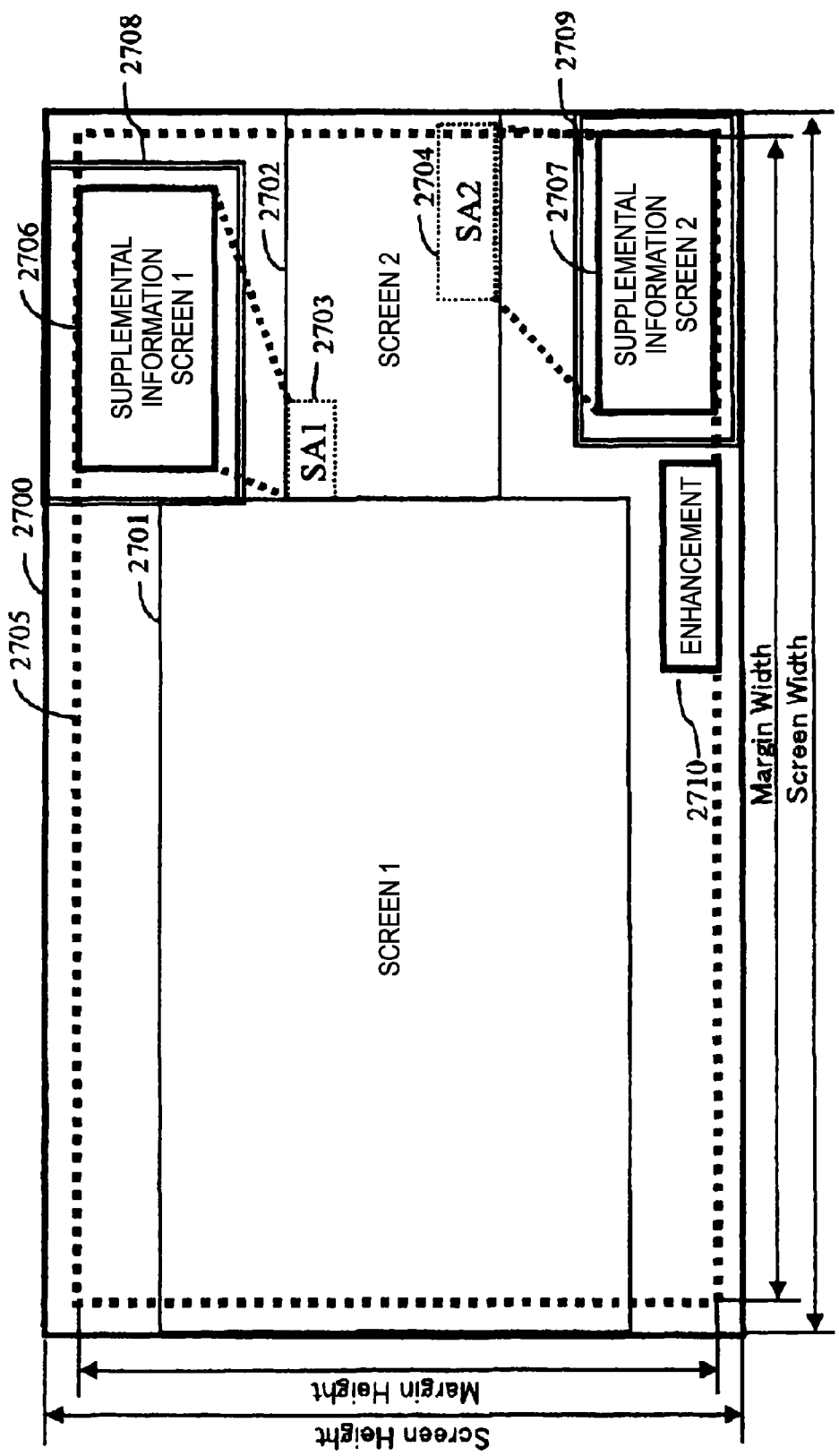
FIG. 27 is a drawing to show the screen layout configuration of "two-screen display state C" shown in FIG. 7(e).

Drawing positions of supplemental information will be discussed below in detail with reference to FIGS. 26 and 27. FIG. 26 is a drawing to show an example of a factor for determining the display location of supplemental information. FIG. 27 is a drawing to show an example of the layout configuration of a display screen.

As shown in FIG. 26, supplemental information 1 (SA-1: 2601), supplemental information 2 (SA-2: 2602), and supplemental information 3 (SA-3: 2603) are defined for an input video screen (2600). In the first embodiment, areas of a first quadrant to a fourth quadrant provided by dividing the screen into four are defined and the supplemental information display determination section 115 determines which quadrant each supplemental information belongs to, thereby determined the rough display position of the supplemental information. For example, supplemental information 1 (SA-1) belongs to the second quadrant, supplemental information 2 (SA-2) belongs to the fourth quadrant, and supplemental information 3 (SA-3) belongs to the first quadrant.

FIG. 27 shows the screen layout configuration of "two-screen display state C" shown in FIG. 7(e). The supplemental information display determination section 115 determines the display position of supplemental information at step S106 shown in the flowchart of FIG. 12 and transfers to the screen configuration management section 103 as the screen layout configuration. Here, for example, supplemental information 1 (SA-1) contained in input image 2 displayed on screen 2 is positioned in the second quadrant as shown in FIG. 26. Thus, in FIG. 27, a predetermined display margin for the boundary line between screens 1 and 2 is subtracted and information is left justified in an upper portion of screen 2 and is displayed in the actual size. Further, supplemental information 2 (SA-2) contained in input video 2 displayed on screen 2 is positioned in the fourth quadrant as shown in FIG. 26. Thus, in FIG. 27, display margin is subtracted for the right end of the display frame rather than the boundary line between screens 1 and 2 and information is right justified in a lower portion of screen 2 and is displayed in the actual size.

In the example, the configuration ratio of screen division is 3:1 and centering is performed with the boundary line between screens 1 and 2 as the borderline, but the display method is not limited to it. For example, in the display method, a display margin may be provided between screens or a frame may be given to each screen. In the embodiment, supplemental information is displayed in the actual size (namely, format of cutting out a part of 100% display of input image), but scaling up or down may be able be selected as desired by the user. Scaling of supplemental information may be changed automatically in association with the layout configuration of the screen. When the screen configuration management section 103 cross-references areas of supplemental information associated with input video and held and displays supplemental information in input video 2, the screen configuration management section 103 may perform processing considering the position of a character area group in input video 1. The processing specifically is processing of changing the position or the display size of supplemental information so that supplemental information of input video 2 does not superpose the character area group of input video 1 or processing of displaying no supplemental information.

In the embodiment, a program broadcasted from a broadcast station (for example, a drama or a baseball relay) is taken as an example of input video. However, it is not a broadcast program and may be any channel or any format such as storage program stored by recording, etc., by another device, video photographed by a person, a video clip created by a third party, or a moving image distributed through a network.

Whether or not supplemental information held by the supplemental information storing section 113 of the embodiment is displayed is determined by condition determination (step S105) shown in FIG. 12 by the supplemental information display determination section 115 by way of example. However, the supplemental information display determination section 115 may add a condition determination in such a manner that it makes a comparison with text data of a program outline, etc., accompanying a broadcast and displays supplemental information only if it matches the contents.

As described above, the video output device 100 of the embodiment dynamically manages the drawing position and the drawing size of at least one input video and performs processing of automatically scaling up an area where occurrence of crush of a character string is determined in scaled-down input image as supplemental information. Accordingly, in the embodiment, the number of operation times of the user required for scale-up display is decreased and information easy to understand is provided in a legible character size, whereby occasion loss of information recognition by the user can be prevented.

In scaled-down input video, a symbol of a nearby logo mark, etc., which is not a character string is also automatically scaled up for display as supplemental information in addition to an area where occurrence of crush of a character string is determined. Accordingly, in the embodiment, information loss of a symbol such as a logo mark by simple text scaling up is prevented and accurate supplemental information can be provided for the user.

When at least one input image is scaled down for display, supplemental information is displayed in an unused area other than the scaled-down display screen (for example, portion of a black belt at the two-screen dividing time). Accordingly, in the embodiment, main viewed video is not disturbed and an empty area can be utilized effectively.

When at least one input image is scaled down for display, supplemental information is displayed in the position close to the character area which becomes the reference source of supplemental information on the scaled-down display screen. Accordingly, in the embodiment, the user can determine by intuition which information is scaled up for display on the scaled-down screen and information easy to understand can be provided.

When at least one input image is scaled down for display, the area which becomes the reference source of supplemental information and scaled-up supplemental information area are visually associated with each by a guideline on the scaled-down display screen. Accordingly, the user can determine by intuition which information is scaled up for display on the scaled-down screen and information easy to understand can be provided.

To display supplemental information in the format of superposing video, the display position of the supplemental information is determined considering what position of video a character area exists at. Accordingly, supplemental information or any other video is not superposed on the character area on video and hiding of character area display on video can be prevented.

If a plurality of character areas exist in input video, supplemental information of the character area determined the smallest in the character area group including the plurality of character areas is preferentially displayed automatically. Accordingly, in the embodiment, extra operation for the user is not required and the character string information hardest to see, of crushed character information by scaling down video can be provided as supplemental information.

In the embodiment, only information displayed for a given time in extracted character areas is displayed as supplemental information. Accordingly, in the embodiment, excessive supplemental information display of instantaneously displayed subtitles, an advertising sign displayed accidentally on video, or a character string displayed suddenly and in a single shot in commercials, etc., can be prevented and possible screen flickering occurrence can be suppressed.

In the embodiment, change in an extracted character string is determined and change in supplemental information is reported as enhancement representation on the screen. Accordingly, in the embodiment, the user need not take care of change in supplemental information at all times and can recognize by intuition a state change in the scaled-down screen by automatically provided visible enhancement display.

In the embodiment, supplemental information matching subsidiary accompanying video, of supplemental information extracted from video is displayed preferentially. Accordingly, in the embodiment, display of a character area not directly involved in the contents of video, such as a character string of an advertising sign displayed accidentally on video, etc., can be prevented.

(Second Embodiment)

The first embodiment shows the case wherein each character area and each object area are extracted from input video and if each character area overlaps an object area, area is cut out as one supplemental information and the supplemental information is superposed for display on an empty area of the screen layout configuration managed by the screen configuration management section 103 in response to the scaling factor of input video. In a second embodiment, the case where a video output device 100 acquires and displays supplemental information from an external server through a network 600 in addition to supplemental information extracted by area determination section 112 of the video output device 100 will be discussed.

Figure 28:
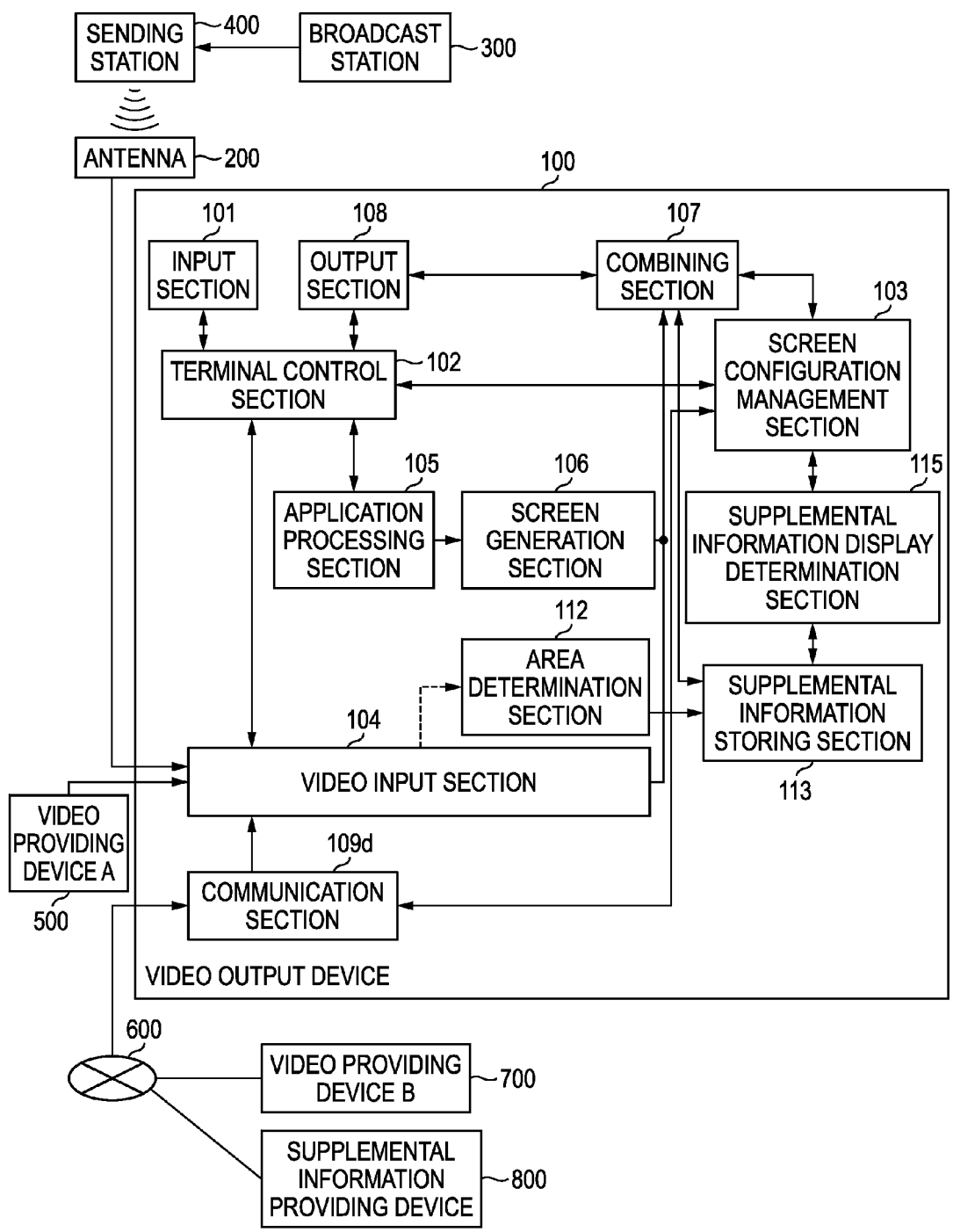
FIG. 28 is a block diagram to show the video output device of the second embodiment and its relevant devices.

In the embodiment, processing of acquiring and displaying supplemental information from an external server will be discussed with reference to FIGS. 28 to 30. FIG. 28 is a block diagram to show the video output device of the second embodiment and its relevant devices. In FIG. 28, the internal configuration of a video input section 104 of the video output device 100 is not shown. FIG. 29 is a drawing to show screen configuration data provided by a supplemental information providing device. FIG. 30 is a drawing to show a display example of supplemental information based on the screen configuration data.

The video output device 100 of the embodiment has a similar configuration to that of the video output device 100 of the first embodiment of the first embodiment. The second embodiment in FIG. 28 differs from the first embodiment shown in FIG. 6 mainly in that a communication section 109*d* connected to the network 600 is connected to a screen configuration management section 103 and that a supplemental information providing device 800 is added as an external server connected to the network 600. The configuration other than the above is similar to that in FIG. 6 and therefore parts similar to those in FIG. 6 are denoted by the same reference numerals in FIG. 28 and will not be discussed again.

The screen configuration management section 103 of the embodiment requests the supplemental information providing device 800 associated with input video displayed on an output section 108 through a combining section 107 to acquire screen configuration data through the communication section 109*d* as required. The supplemental information providing device 800 returns screen configuration data as shown in FIG. 29 describing the display position of supplemental information, etc., in the screen configuration of input video being viewed in the video output device 100 in response to the request from the video output device 100. The screen configuration management section 103 analyzes the screen configuration data acquired through the communication section 109*d* and determines which area supplemental information is displayed in for input video.

For example, for the input video 2 (baseball relay) used in the description of the first embodiment, three pieces of supplemental information 1 to 3 are defined as shown in FIG. 29. As supplemental information 1 to 3 in the second embodiment batter score (RP-1), progress information (RP-2), and speed of pitched ball (RP-3) exist and information of width (W), height (H), horizontal axis (X), and vertical axis (Y) is described as the display position of each supplemental information. Further, as one embodiment, supplemental information URLs (Uniform Resource Locators) of Japanese version and English version are added. For the supplemental information URL, in addition to information concerning the display position of supplemental information, the supplemental information providing device 800 provides supplemental information and the information can be acquired through the network 600.

The case where language setting is selected as Japanese as one of profiles that can be selected as desired by the user operating the video output device 100 will be discussed. The profile containing the language setting is recorded in a record medium that the screen configuration management section 103 or the video output device of the embodiment has. For example, it is assumed that the progress information (RP-2) and the speed of pitched ball (RP-3) are represented in English. The screen configuration management section 103 acquires "supplemental information of Japanese version" provided by the supplemental information providing device 800 using supplemental information URL in accordance with the language setting and superposes it on input video for display as supplemental information. For example, as shown in FIG. 30, the display areas of supplemental information 1 to 3 (3001 to 3003) intended by the broadcast station can be determined in a screen (3000) according to the screen configuration data. The screen configuration management section 103 displays the portion displayed as "9th" in essential input video 2 as "9 kai" and the portion displayed as "142 Km/h" as "Jisoku 142 Km" according to the image acquired using supplemental information URL.

In the second embodiment, an image is acquired using supplemental information URL, but a moving image distributed in streaming or text may be acquired.

In the second embodiment, the image configuration data acquired from the supplemental information providing device 800 through the network 600 contains outline of supplemental information indicated by the program provider of a broadcast station, etc., position information of display area, and supplemental information URL to supplemental information provided by the supplemental information providing device 800 by way of example. However, the contained information is not limited to them and relevant information, URL for accessing relevant information, the second audio program channel that can be acquired through the network 600, and the like may be contained. The user can change setting of the supplemental information providing device 800 by one of application processing section 105 of the video output device 100 or a browser, etc., of a personal computer. To change the setting, the display position of supplemental information relative to input video or the relative display position of supplemental information to the screen (3000) when input screen is scaled down (or screen division of input video is performed) may be changed as supplemental information display specification area.

As described above, in the embodiment, supplemental information is selected and displayed in accordance with the profile of the user from among different types of supplemental information. Thus, in the video output device in which Japanese is set as language setting, supplemental information of Japanese version is displayed. The screen configuration management section 103 may translate supplemental information into a different language. For example, the screen configuration management section 103 translates text extracted as English into Japanese for display in accordance with an English-Japanese dictionary. Thus, in the embodiment, supplemental information can be displayed in response to the language setting selected by the user.

The video output device may extract and display video which becomes supplemental information using a supplemental information area contained in supplemental information area pattern data acquired from the outside of the video output device. The supplemental information area pattern data is data indicating the position of the supplemental information area in input video. In this case, processing load on the video output device required for calculating the supplemental information area is lightened and the video output device can reliably determine the supplemental information area intended by the video producer.

The video output device may display supplemental information in accordance with supplemental information display specification area contained in the screen configuration data acquired from the outside of the video output device. In this case, processing load on the video output device required for calculating the display position and the size of supplemental information is lightened and the video output device can reliably display the supplemental information in the specification area intended by the user.

The invention is not limited to the first or second embodiment described above. The following cases are also included in the invention:

(1) Each device described above is specifically a computer system made up of a microprocessor, ROM, RAM, a hard disk unit, a display unit, a keyboard, a mouse, etc. A computer program is stored in the RAM or the hardware disk unit. The microprocessor operates in accordance with the computer program, whereby each device accomplishes the function. The computer program is made up of instruction codes indicating commands for the computer to accomplish a predetermined function.

(2) Some or all of the components making up each device described above may be implemented as one system LSI (Large Scale Integration). The system LSI is a supermultiple function LSI manufactured by integrating a plurality of components on one chip and specifically is a computer system made up of a microprocessor, ROM, RAM, etc. A computer program is stored in the RAM. The microprocessor operates in accordance with the computer program, whereby the system LSI accomplishes the function.

(3) Some or all of the components making up each device described above may be implemented as an IC card or a single module that can be attached to or detached from each device. The IC card or the module is a computer system made up of a microprocessor, ROM, RAM, etc. The IC card or the module may contain the above-mentioned supermultiple function LSI. The microprocessor operates in accordance with the computer program, whereby the IC card or the module accomplishes the function.

(4) The invention may be the methods described above. The methods may be computer programs executed by a computer.

The invention may be recorded in a computer-readable record medium of the computer program or the digital signals, for example, a flexible disk, a hard disk, an optical disk, semiconductor memory, etc.

The invention may transmit the computer program via a telecommunication line, a wireless or wired communication line, a network typified by the Internet, data broadcast, etc.

The invention may be a computer system including a microprocessor and memory and the memory may store the computer program and the microprocessor may operate in accordance with the computer program.

The program or the digital signals are recorded in the record medium and the record medium is moved or the program or the digital signals are moved via the network, etc., whereby the program or the signals may be executed by another independent computer system.

(5) The embodiments and the modified examples may be combined.

While the invention has been described in detail with reference to the specific embodiments, it will be obvious to those skilled in the art that various changes and modifications can be made without departing from the spirit and the scope of the invention.

This application is based on Japanese Patent Application (No. 2008-264004) filed on Oct. 10, 2008, which is incorporated herein by reference.

Industrial Applicability

The video output device according to the invention can be applied to a digital TV receiver, a digital video disk recorder, a set top box, a projector, an external monitor, a personal computer for outputting video to the outside, a mobile device having a video display output function, etc.

[Description Of Reference Numerals]
100 Video output device
101 Input section
102 Terminal control section
103 Screen configuration management section
104 Video input section
105 Application processing section
106 Screen generation section
107 Combining section
108 Output section
109*a* First tuner
109*b* Second tuner
109*c* External input section
109*d* Communication section
110 Decoder
111 Processing section
112 Area determination section
113 Supplemental information storing section
115 Supplemental information display determination section
200 Antenna
300 Broadcast station
400 Sending station
500 Video providing device A
600 Network
700 Video providing device B
800 Supplemental information providing device

The invention claimed is:

1. A video output device comprising:
a screen configuration management section that manages a placement or a scaling of a screen for displaying at least one video and maintains a profile setting specified by a user that establishes desired content that is to be displayed in a character area in an input video, wherein the desired content is selected from a plurality of different types of content;
an area determination section that determines the character area in the input video;
a communication section that acquires a character string included in at least one character area determined by the area determination section as supplemental information from an external server in accordance with the profile setting specified by the user;
a supplemental information display determination section that determines whether or not the supplemental information acquired by the communication section is displayed in addition to an input video based on the screen configuration managed by the screen configuration management section and the profile setting specified by the user; and an output section that outputs the input video and the supplemental information in accordance with commands from the screen configuration management section and the supplemental information display determination section, wherein when a size of a character included in the at least one character area determined by the area determination section is smaller than a threshold value, the supplemental information display determination section displays the supplemental information.

2. The video output device according to claim 1, wherein the communication section receives screen configuration data indicating a placement and a size of a screen for displaying at least one video from an external server, wherein the screen configuration management section manages the screen configuration in accordance with the screen configuration data acquired from the external server by the communication section; and wherein the supplemental information display determination section performs a processing so as to display the supplemental information in an area specified by the screen configuration data.

3. The video output device according to claim 1, wherein the supplemental information display determination section determines that the supplemental information acquired by the communication section is to be displayed in addition to the input video in response to a determination that input video content to be displayed in the character area is different than desired content that is to be displayed in the character area in accordance with the profile setting specified by the user.

4. The video output device according to claim 3, wherein the input video content to be displayed in the character area includes text written in a first language and the desired content that is to be displayed in the character area in accordance with the profile setting includes text written in a second language that is different from the first language.

5. A video output method, comprising:

determining a character area in an input video;

acquiring a character string included in at least one character area as supplemental information from an external server, wherein said acquiring comprises selecting the supplemental information from among different types of supplemental information available from the external server in accordance with a profile setting governing how content is to be displayed in the character area specified by a user;

determining whether or not to display the supplemental information acquired from the external server in addition to an input video based on a screen configuration for defining a placement or a scaling of a screen for displaying at least one video; and outputting the input video and the supplemental information in accordance with the screen configuration and the determination result, wherein when a size of a character included in the at least one character area is smaller than a threshold value, it is determined that the supplemental information is displayed.

6. The video output method according to claim 5, wherein said determining whether or not to display the supplemental information comprises comparing input video content that is to be displayed in the character area how content is to be displayed in the character area based on the profile setting, and determining to display the supplemental information if the input video content does not match how the content is to be displayed in the character area based on the profile setting.

7. The video output method according to claim 6, wherein the profile setting establishes a language in which textual content is to be displayed in the character area.

* * * * *